United States Patent [19]
Pinnavaia et al.

[11] Patent Number: 6,027,706
[45] Date of Patent: Feb. 22, 2000

[54] POROUS ALUMINUM OXIDE MATERIALS PREPARED BY NON-IONIC SURFACTANT ASSEMBLY ROUTE

[75] Inventors: Thomas J. Pinnavaia; Wenzhong Zhang, both of East Lansing, Mich.

[73] Assignee: Board of Trustees operating Michigan State University, East Lansing, Mich.

[21] Appl. No.: 09/072,870

[22] Filed: May 5, 1998

[51] Int. Cl.[7] ..................................................... C01F 7/02
[52] U.S. Cl. .......................... 423/600; 423/625; 423/628; 423/630; 423/702; 423/713
[58] Field of Search .................................. 423/702, 713, 423/600, 625, 628, 630

[56] References Cited

U.S. PATENT DOCUMENTS

| | | |
|---|---|---|
| 3,709,979 | 1/1973 | Chu . |
| 4,108,881 | 8/1978 | Rollmann et al. . |
| 4,151,189 | 4/1979 | Rubin et al. . |
| 4,391,785 | 7/1983 | Rosinski et al. . |
| 5,098,684 | 3/1992 | Kresge et al. . |
| 5,102,643 | 4/1992 | Kresge et al. . |
| 5,143,879 | 9/1992 | Whitehurst . |
| 5,622,684 | 4/1997 | Pinnavaia . |
| 5,785,946 | 7/1998 | Pinnavaia et al. ....................... 423/701 |
| 5,795,559 | 8/1998 | Pinnavaia et al. ....................... 423/702 |
| 5,840,271 | 11/1998 | Carrazza et al. ......................... 423/700 |
| 5,863,515 | 1/1999 | Davis et al. .............................. 423/628 |

FOREIGN PATENT DOCUMENTS

| | | |
|---|---|---|
| 891 947 | 1/1999 | European Pat. Off. . |

OTHER PUBLICATIONS

Breck, D. W., Zeolite Molecular Sieves: Structure, Chemistry and Use; Wiley and Sons, London, pp. 1 to 100 (1974) (no month).
Meier et al., Atlas of Zeolite Structue Types, Butterworth, Olodon, pp. 451 to 469 (1992) (no month).
Barrer et al., Zeolites, vol. 1, 130–140 (1981) (no month).
Lok et al., Zeolites, vol. 3, 282–291, (1983) (no month).
Davis et al., Chem Mater., vol. 4, 756–768 (1992) (no month).
Gies et al., Zeolites, vol. 12, 42–49 (1992) no month.
Hearmon et al., Zeolites, vol. 10, 608–611, (1990) (no month).
Davis et al., Nature, vol. 331, 698–699 (1988) (no month).
Estermann, M. et al., Nature, vol. 352:320–323 (1991) (no month).
Thomas J. M. et al., J. Chem Soc. Chem. Commun., 875–876 (1992) (no month).
Soghmonian et al., Agwen, Chem. Int. Ed. Engl., vol. 32: 610–611 (1993) (no month).
Beck et al., J. Am. Chem Soc., vol. 114:10834–10843 (1992) (no month).
Stucky et al., Nature, vol. 368, 317–321 (1994) (no month).
Pinnavaia et al., Science, vol. 267:865–867 (1995) (no month).
Davis et al., Chem. Mater., 8:1451 (1996) (no month).
Yada et al., J. Chem Soc., Chem. Commun., p 769 (1996) (no month).
Pinnavaia et al., Science, 269:1242 (1995) (no month).
Bagshaw, et al, Agwen. Chem. Int. Ed. Engl. 35: 1102 (1996) (no month).

(List continued on next page.)

*Primary Examiner*—Mark L. Bell
*Assistant Examiner*—David Sample
*Attorney, Agent, or Firm*—Ian C. McLeod

[57] ABSTRACT

Semi-crystalline alumina compositions with framework mesopores are disclosed. The compositions are assembled from inorganic aluminum precursors and nonionic polyethylene oxide surfactants. The new assembly pathway introduces several new concepts to alumina mesostructure synthesis. The application of low-cost, non-toxic and biodegradable surfactants and low cost aluminum reagents as alumina precursors which are inorganic and low solution reaction temperatures, introduces efficient and environmentally clean synthetic techniques to the formation of mesostructures. Recovery of the surfactant can be achieved through solvent extraction where the solvent may be water or ethanol or by calcination.

41 Claims, 24 Drawing Sheets

OTHER PUBLICATIONS

Horvath, G., et al., J. Chem. Eng. Jpn. 16:470 (1983) (no month).

Barrett, E. P., et al., J. Amer. Chem. Soc. 73:373 (1951) (no month).

Fu, G. and L.F. Nazar, Chem. Mater. 3:602–610 (1991) (no month).

Church, Jeffrey S., et al, Applied Catal. 101: 105–116 (1993) (no month).

Burtin, P., et al., Applied Catal. 34:225–238 (1987) (no month).

Schaper, H., et al., Applied Catal. 7:211–220 (1983) (no month).

Wefers, Karl, et al., "Oxides and Hydroxides of Aluminum", Alcoa Technical Paper No. 19, Revised (1987) (no month).

Tanev, Peter T., et al., Catalysis Letts. 19: 351–360 (1993) (no month).-

Igepal RC-760

PEO₁₈

Fatty Acid Ethoxylate

Pluronic 64 L

Fatty Amine Ethoxylate

Fatty Acid PPO/PEO block co-polymer

POROUS ALUMINUM OXIDE MATERIALS PREPARED BY NON-IONIC SURFACTANT ASSEMBLY ROUTE

GOVERNMENT RIGHTS

The present invention was sponsored under National Science Foundation Grant No. CHE-9633798. The Government has certain rights to this invention.

BACKGROUND OF INVENTION (1) Field of Invention

This invention relates to the synthesis of semi-crystalline, mesostructure aluminum oxide materials possessing framework mesopores. In particular, the present invention relates to such materials where the formation of the mesoporous structure is accomplished by a novel molecular assembly mechanism involving various nonionic surfactants, particularly polyethylene oxide based surfactants, and various alumina precursors in the absence of an aluminum alkoxide, which is conventionally used. This nonionic surfactant templating approach allows for the removal of surfactant through calcination or, more preferably, through solvent extraction from the hydrolysis product which lowers material and energy costs. The surfactant is preferably biodegradable. The assembly approach affords non-lamellar mesostructures of aluminum oxide.

(2) Description of Prior Art

Modern human activities rely greatly upon porous solids of both natural and synthetic design. The pore structures of such solids are generally formed during crystallization or during subsequent treatments. These solid materials are classified depending upon their predominant pore sizes: (i) microporous, with pore sizes <1.0 nm; (ii) macroporous, with pore sizes exceeding 50.0 nm; and mesoporous, with pore sizes intermediate between 1.0 and 50.0 nm. Macroporous solids find limited use as adsorbents or catalysts owing to their low surface areas and large non-uniform pores. Micro- and mesoporous solids however, are widely utilized in adsorption, separation technologies and catalysis, particularly in the processing and refining of petroleum. There is an ever increasing demand for new, highly stable well defined mesoporous materials because of the need for ever higher accessible surface areas and pore volumes in order that various chemical processes may be made more efficient or indeed, accomplished at all.

Porous materials may be structurally amorphous, para-crystalline or crystalline. Amorphous materials, such as silica gel or alumina gel, do not possess any crystallographic order, whereas para-crystalline solids such as the transition aluminas γ- or η-alumina are semi-ordered, producing broad X-ray diffraction peaks. Both these classes of materials exhibit very broad pore distributions. This wide pore distribution however, limits the effectiveness of catalysts, adsorbents and ion-exchange systems prepared from such materials. The very broad pore distribution is particularly limiting in the use of these aluminas in petroleum refining.

Those skilled in the art of petroleum hydrobreaking and petroleum hydrocracking will know that the reactivity and selectivity of alumina catalysts used in these processes depends on the pore size distribution and the overall surface area. Narrow pore size distribution in the mesopore range 5–12 nm are especially desired for this purpose.

Zeolites and some related molecular sieves such as; alumino-phosphates and pillared interlayered clays, possess rigorously uniform pore sizes. Zeolites are highly crystalline microporous aluminosilicates where the lattice of the material is composed of $IO_4$ tetrahedra (I=Al, Si) linked by sharing the apical oxygen atoms. Cavities and connecting channels of uniform size form the pore structures which are confined within the specially oriented $IO_4$ tetrahedra (Breck, D. W., *Zeolite Molecular Sieves: Structure, Chemistry and Use*; Wiley and Sons; London, pages 1 to 100 (1974)). Zeolites are considered as a subclass of molecular sieves owing to their ability to discriminate small molecules and perform chemistry upon them. Molecular sieves in general are materials with crystalline frameworks in which tetrahedral Si and/or Al atoms are entirely or in part substituted by other atoms such as B, Ga, Ge, Ti, Zr, V, Fe or P. Negative charge is created in the zeolite framework by the isomorphous substitution of $Si^{4+}$ ions by $Al^{3+}$ or similar ions. In natural zeolites, this charge is balanced by the incorporation of exchangeable alkali or alkaline earth cations such as $Na^+$, $K^+$, $Ca^{2+}$. Synthetic zeolites utilize these and other cations such as quaternary ammonium cations and protons as charge balancing ions. Zeolites and molecular sieves are generally prepared from aluminosilicate or phosphate gels under hydrothermal reaction conditions. Their crystallization, according to the hereafter discussed prior art, is accomplished through prolonged reaction in an autoclave for 1–50 days and oftentimes, in the presence of structure directing agents (templates). The correct selection of template is of paramount importance to the preparation of a desired framework and pore network. A wide variety of organic molecules or assemblies of organic molecules with one or more functional groups are known in the prior art to provide more than 85 different molecular sieve framework structures. (Meier et al., *Atlas of Zeolite Structure* types, Butterworth, London, pages 451 to 469 (1992)).

Recent reviews on the use of templates to direct the synthesis of zeolites and molecular sieves, as well as the mechanisms of structure direction, have been produced by Barrer et al., *Zeolites*, Vol. 1, 130–140, (1981); Lok et al., *Zeolites*, Vol. 3, 282–291, (1983); Davis et al., *Chem Hater.*, Vol. 4, 756–768, (1992) and Gies et al., *Zeolites*, Vol 12, 42–49, (1992). For example, U.S. Pat. No. 3,702,886 teaches that an aluminosilicate gel (with high Si/Al ratio) crystallized in the presence of quaternary tetrapropyl ammonium hydroxide template to produce zeolite ZSM-5. Other publications teach the use of different organic templating agents and include; U.S. Pat. No. 3,709,979, wherein quaternary cations such as tetrabutyl ammonium or tetrabutyl phosphonium ions crystallize ZSM-11 and U.S. Pat. No. 4,391,785 demonstrates the preparation of ZSM-12 in the presence of tetraethyl ammonium cations. Other prior art teaches that primary amines such as propylamine and i-propylamine (U.S. Pat. No. 4,151,189), and diamines such as diaminopentane, diaminohexane and diaminododecane (U.S. Pat. No. 4,108,881) also direct the synthesis of ZSM-5 type structure. Hearmon et al (*Zeolites*, Vol. 10, 608–611, (1990)) however, point out that the protonated form of the template molecule is most likely responsible for the framework assembly.

In summary, most of the zeolites and molecular sieve frameworks taught in the prior art are assembled by using quaternary ammonium cations or protonated forms of amines and diamines as templates.

The need for new and useful types of stable frameworks and the need to expand the uniform pore size into the mesopore region allowing the adsorption and discrimination of much larger molecules, has driven the search for organic structure-directing agents that will produce these new structures. In the prior art however, molecular sieves possess uniform pore sizes in the microporous range. These pore sizes and therefore the molecular sieving abilities of the materials are predetermined by the thermodynamically favored formation of framework windows containing 8, 10 and 12 I-atom rings. The largest pore size zeolites previously available were the naturally occurring faujasite (pore size 0.74 nm) or synthetic faujasite analogs, zeolites X and Y with 0.8 nm pore windows (Breck, D. W., *Zeolite Molecular Sieves: Structure, Chemistry and Use*; Wiley and Sons; London, pages 1 to 100 (1974)). The innovative use of aluminophosphate gels has allowed the synthesis of new large pore materials. Thus, an 18 I-atom ring aluminophosphate molecular sieve; VPI-5 (Davis et al., *Nature*, Vol. 331, 698–699, (1988)) was produced and found to consist of an hexagonal arrangement of one dimensional channels (pores) of diameter ≈1.2 nm. A gallophosphate molecular sieve cloverite, with pore size of 1.3 nm was reported by Estermann M. et al (*Nature*, Vol 352, 320–323, (1991)), while recently, Thomas J. M. et al (*J. Chem. Soc. Chem. Commun.*, 875–876, (1992)) reported a triethyl ammonium cation directed synthesis of a novel 20 I-atom ring aluminophosphate molecular sieve (JDF-20), with uniform pore size of 1.45 nm (calculated from lattice parameters). A vanadium phosphate material was very recently reported with 1.84 nm lattice cavity (Soghmonian et al., Agwen. Chem. Int. Ed. Engl., Vol. 32, 610–611, (1993)). However, the true pore sizes of the latter two materials are unknown since sorption data were not made available and furthermore, these materials are not thermally stable.

In summary, in spite of significant progress made toward the preparation of large pore size materials, thermally stable molecular sieves were still only available with uniform pore sizes in the microporous range until 1992.

In 1992, a breakthrough in the preparation of mesoporous silica and aluminosilicate molecular sieves was disclosed in U.S. Pat. Nos. 5,098,684 and 5,102,643. The class of mesoporous materials (denoted as M41S) claimed in this prior art was found to possess uniform and adjustable pore size in the range 1.3–10.0 nm. These materials exhibited framework wall thickness from 0.8 to 1.2 nm and elementary particle size generally greater than 50.0 nm. By varying the synthesis conditions, M41S materials with hexagonal (MCM-41), cubic (MCM-48) or layered morphologies have been disclosed (Beck et al., *J. Am. Chem. Soc.*, Vol. 114, 10834–10843, (1992)). The mechanism proposed for the formation of these materials involves strong electrostatic interactions and ion pairing between long chain quaternary alkyl ammonium cations, as structure directing agents, and anionic silicate oligomer species (U.S. Pat. No. 5,098,684). Recently, Stucky et al (Nature, Vol. 368, 317–321 (1994)) extended this assembly approach by proposing four complementary synthesis pathways. The direct co-condensation of anionic inorganic species ($I^-$) with a cationic surfactant ($S^+$) to give assembled ion pairs ($S^+I^-$), for example MCM-41, was described as Pathway 1. The charge reversed situation with an anionic template ($S^-$) being used to direct the assembly of cationic inorganic species ($I^+$) to ion pairs ($S^-$, $I^+$) was Pathway 2. Hexagonal iron and lead oxide and lamellar lead and aluminum oxide phases have been reported using Pathway 2 (Stucky et al. ibid.). Pathways 3 and 4 involve the mediation of assemblies of surfactants and inorganic species of similar charge by oppositely charged counterions ($X^-=Cl^-$, $Br^-$, or $M^+=Na^+$, $K^+$). The viability of Pathway 3 was demonstrated by the synthesis of hexagonal MCM-41 using a quaternary alkyl ammonium cation template under strongly acidic conditions (5–10 mol $L^{-1}$ HCl or HBr) in order to generate and assemble positively charged framework precursors (Stucky et al. ibid). Pathway 4 was demonstrated by the condensation of anionic aluminate species with an anionic template ($C_{12}H_{25}PO_3^-$) via alkali cation mediated ($Na^+$, $K^+$) ion pairing, to produce a lamellar $Al(OH)_3$ phase.

All of the aforementioned synthetic pathways involve charge matching between ionic organic directing agents and ionic inorganic precursors. The template therefore, is strongly bound to the charged framework and difficult to recover. For example, in the original Mobil patent (U.S. Pat. No. 5,098,684) the template was not recovered, but burned off by calcination at elevated temperature. Template removal of cationic surfactant has however, been demonstrated by ion-exchange with low pH acidic cation donor solutions (U.S. Pat. No. 5,143,879). Template-halide pairs in the framework of acidic Pathway 3 materials can be partially displaced by ethanol extraction (Stucky et al. Ibid). Thus, ionic template recovery is only possible, if exchange ions or ion pairs are present during the extraction process.

Most recently, the formation of mesoporous molecular sieves via a new route (Pathway 5) was proposed by Pinnavaia et al. (*Science*, Vol. 267, 865–867, (1995)). In this method, the self assembly of micelles of neutral primary amines ($S^\circ$) and neutral inorganic alkoxide precursors ($I^\circ$) was based upon hydrogen bonding between the two components. The new approach ($S^\circ$, $I^\circ$) taught in that prior art afforded mesostructures with greater wall thicknesses, smaller particle sizes and complementary framework-confined mesoporosities relative to Pathway 1 and 3 materials. In addition, owing to the weak template-framework interactions, Pathway 5 allowed for the facile solvent extraction of the template, removing the need for cation donors or ion pairs. These mesoporous structures are described in U.S. patent application Ser. No. 08/431,310, filed Apr. 28, 1995 and related U.S. patent applications.

Davis and his co-workers have prepared porous aluminas (~20 Å pore diameters) by the hydrolysis of aluminum alkoxides in the presence of a carboxylate surfactant as the structure director (Davis et al., Chem. Mater., 8:1451 (1996)). The assembly pathway involved S—I complexation reaction between the surfactant (S) and the inorganic reagent (I), as judged by the presence of IR bands characteristic of chelating carboxylate groups. Yada et al. reported the preparation of hexagonal alumina mesostructures by electrostatic $s^-I^+$ assembly of dodecylsulfate surfactants and aluminum nitrate (Yada et al., J. Chem. Soc., Chem. Commun., P769, (1996)). However, the mesostructures were not stable to surfactant removal. In contrast, Pinnavaia and Bagshaw have obtained mesoporous alumina molecular sieves, denoted MSU-X, by using nonionic polyethylene oxide surfactants and an aluminum alkoxide as the inorganic precursor (Pinnavaia et al., Science, 269:1242 (1995)), Bagshaw et al, Agwen. Chem. Int. Ed. Engl., 35:1102 (1996) and U.S. Pat. No. 5,622,684). These materials exhibited characteristic wormhole channel motifs. The problem is that aluminum alkoxide reagents are expensive.

In summary, according to the prior art, the molecular sieve materials and preparation techniques provide several distinct disadvantages and advantages:

i) The prior art of Pathways 1 through 4 teaches the use of charged surfactant species as templates in order to assemble inorganic frameworks from charged inorganic precursors. These charged templates are generally expensive, strongly bound to the inorganic framework and therefore difficult to recover. Additionally, many of these templates such as the most commonly used quaternary ammonium cations are highly toxic and environmentally undesirable. In the prior art of Pathways 1 to 4, the template was removed from the structure by either calcining it out or by ion-exchange reactions. Pathway 5 prior art templates are also highly toxic and environmentally unsuitable, but may be removed through environmentally benign ethanol extraction and thereby recovered and reused. No thermal stable mesostructured alumina has been produced through pathways 1 to 5.

There is a need for new methods of preparation of new materials of these types, cost reductions, ease of recoverability and environmental compatibility in the template and inorganic precursors has lead to the development of a new synthetic method to be described herein.

OBJECTS OF THE INVENTION

It is therefore an object of the present invention to provide a new approach to the design and synthesis of semicrystalline aluminum oxide compositions with disordered mesopores from inexpensive inorganic aluminum oxide precursors. Further, it is an object of the present invention to provide inexpensive templates, inorganic aluminum oxide precursors and methods while avoiding high energy demanding and costly hydrothermal syntheses. Further, it is an object of the present invention to provide a structure-directing surfactant that allows for facile recovery and thereby recycling of the template from the condensed alumina structure via solvent extraction. Further, it is an object of the present invention to provide a surfactant system that affords semicrystalline mesoporous alumina compositions through lower cost, lower toxicity than either quaternary ammonium or amine surfactants and template biodegradability. Finally, it is an object of the present invention to provide for the preparation of well defined non-layered mesoporous aluminum oxides that are not accessible through the prior art. Yet another objective is to provide for stabilized forms of the semicrystalline mesoporous alumina through the incorporation of stabilizing elements in the alumina structure. Yet another objective introduces functional elements into the alumina framework structure for catalytic applications of the composition. These and other objects will become increasingly apparent by reference to the following description and the drawings.

DESCRIPTION OF PREFERRED EMBODIMENTS

Figure 1A:
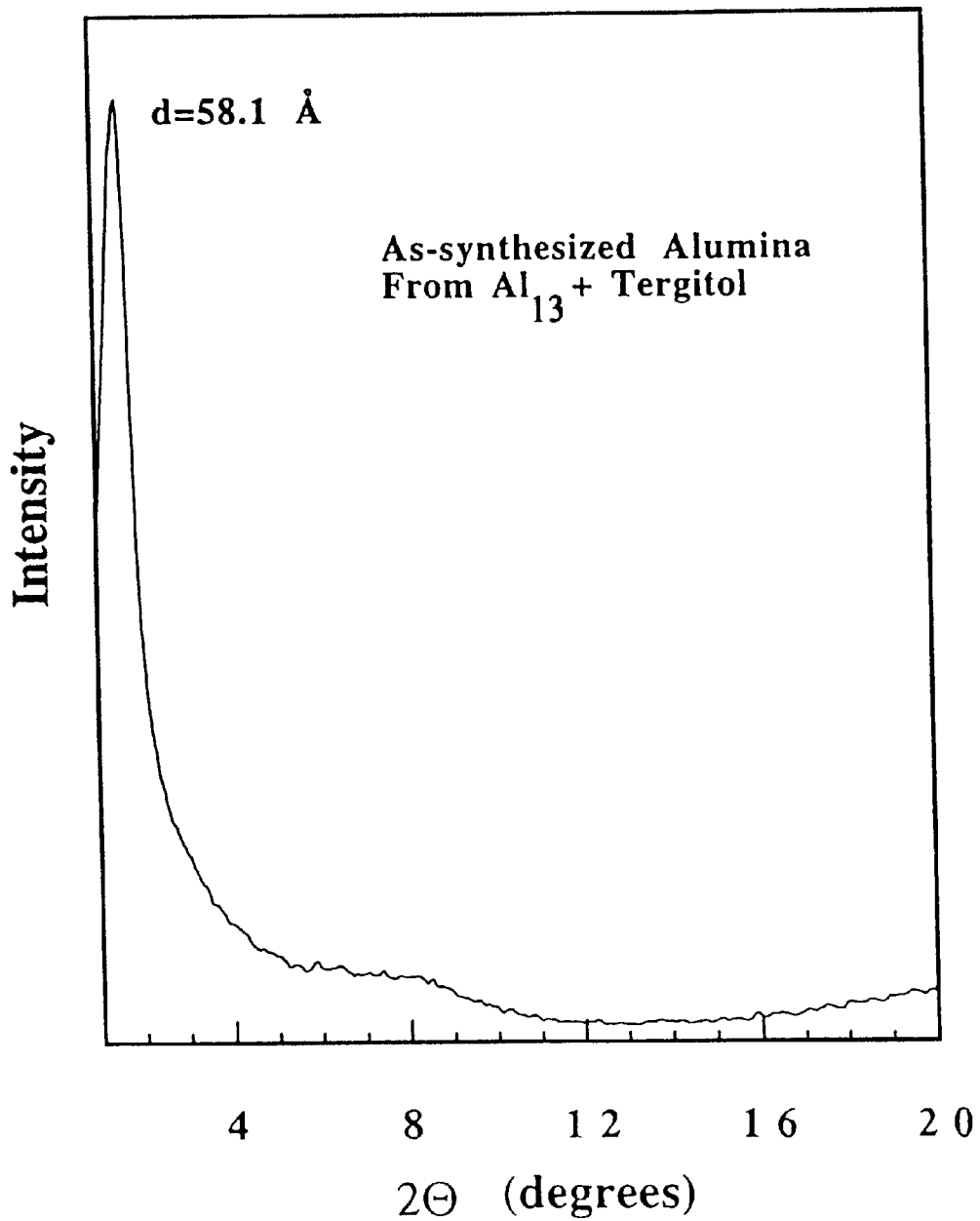
FIGS. 1A and 1B are graphs showing a representative x-ray powder diffraction pattern for as synthesized and calcined mesoporous alumina, prespectively, of Example 1. The aluminum precursor was aluminum chlorohydrate and the surfactant was TERGITOL 15-S-7.

The present invention relates to a synthetic, mesostructured hydroxylated aluminum oxide composition, also referred to herein as an "alumuna" which optionally can contain metallic and non-metallic elements substituting for a small part of the aluminum having at least one resolved X-ray diffraction peak corresponding to a basal spacing of at least 3.0 nm, framework confined pores at least 1.5 nm in diameter, a specific surface area of at least 150 $m^2/g$ prepared from an inorganic alumina precursor and a pore forming nonionic surfactant in the absence of an aluminum alkoxide.

The present invention also relates to a synthetic mesostructured hydroxylated aluminum oxide composition prepared from a reaction mixture comprising a nonionic surfactant and an inorganic aluminum reagent selected from the group comprising a cationic aluminum salt, a cationic aluminum oligomer, a reactive alumina and mixtures thereof in the presence of a base or a base precursor to adjust pH and in the absence of an aluminum alkoxide to provide the composition which has disordered mesopores.

The present invention further relates to a process for the preparation of a synthetic mesostructured alumina composition which comprises:

(a) providing an amorphous aluminum hydroxide which has been precipitated from an aqueous solution;

(b) peptizing the alumina hydroxide of step (a) by addition of an acid;

(c) aging the solution of step (b) at a first temperature between about 0° C. and 100° C., more preferably between 35 and 85° C.;

(d) mixing the product of step (c) with a nonionic surfactant;

(e) aging the solution of step (d) at a second temperature between about 0° C. and 100° C., more preferably between 35 and 85° C.;

(f) adjusting the pH of the product of step (e) to between about pH 6 to 8 using a base;

(g) separating the product from step (f); and (h) removing the surfactant from the solid product to produce the mesostructured aluminum oxide composition, wherein the aluminum oxide can be hydroxylated.

The present invention further relates to a method for the preparation of a synthetic mesostructured alumina composition which comprises:

(a) preparing an aqueous solution of a cationic aluminum salt;

(b) preparing a freshly precipitated aluminum hydroxide from the salt by addition of aqueous solution of a base selected from the group comprising urea and ammonia to the solution obtained in step (a), preferably until the pH is in the range 5–7, and more preferably near 6.0;

(c) treating the precipitate obtained from step (b) with an acid selected from the group comprising HCl and $HNO_3$ solution by selecting a $H^+$ to Al ratio between about 0.3 to 1, and aging the mixture at a temperature between ambient temperature to 100° C., more preferably between 35 and 85° C.;

(d) mixing a nonionic surfactant with the mixture obtained in step (c), and aging it at a temperature between 0° C. and 100° C., more preferably 35–85° C.;

(e) adjusting the pH of mixture (d) to about 5.5 to 8 by adding a base selected from the group comprising aqueous ammonia, ammonium carbonate and urea and optionally aging the mixture at ambient temperature;

(f) separating the solid product from the mixture obtained from step (e) from the liquid;

(g) drying the solid product at a temperature between ambient temperature and 150° C.; and (h) removing the surfactant contained in the solid product obtained from step (g) by a method selected from the group comprising organic solvent extraction and calcination at a temperature between 250° and 1000° C., wherein the aluminum oxide can be hydroxylated.

The present invention further relates to a method for the preparation of a synthetic mesostructured aluminum oxide which composition comprises:

(a) preparing an aqueous mixture of a starting agent selected from a group comprising amorphous alumina sol, amorphous alumina gel, aluminum chlorohydrate, aluminum nitrohydrate or polymeric forms of aluminum chlorohydrate or aluminum nitrohydrate;

(b) mixing a nonionic surfactant with the mixture obtained in step (a), and aging it at a temperature between about 0° C. and 100° C.;

(c) adjusting the pH of mixture (b) to about 5.5 to 8 by selecting a base selected from the group comprising aqueous ammonia, ammonium carbonate and urea, and optionally aging the mixture at ambient temperature;

(d) separating the solid product from the mixture obtained from step (c) from the liquid;

(e) drying the solid product at a temperature between ambient temperature and 150° C.; and (f) removing the surfactant contained in the solid product obtained from step (e) by a method selected from the group comprising organic solvent extraction and calcination at a temperature between 250 and 1000° C., wherein the aluminum oxide can be hydroxylated The present invention further relates to a method for the preparation of a synthetic mesostructured alumina composition which comprises:

(a) preparing an aqueous slurry of a starting reagent selected from a group comprising amorphous aluminum hydroxide, pseudobohmite, a transition alumina, and flash calcined aluminum trihydrate;

(b) peptizing the slurry obtained from step (a) by using an acid selected from a group comprising HCl, $HNO_3$, acetic acid, hexanoic acid and gluconic acid with a $H^+$ to Al ratio between 0.3 to 1, and aging the mixture at a temperature between ambient temperature to 100° C.;

(c) mixing a nonionic surfactant with the mixture obtained in step (b), and aging it at a temperature between ambient temperature and about 100° C.;

(d) adjusting the pH of mixture (c) to about 5.5 to 8 by selecting a base from the group comprising aqueous ammonia, ammonium carbonate and urea, and optionally aging the mixture at ambient temperature;

(e) separating the solid product from the mixture obtained from step (d) from the liquid;

(f) drying the solid product at a temperature between ambient temperature and 150° C.; and (g) removing the surfactant contained in the solid product obtained from step (f) by a method selected from the group comprising organic solvent extraction and calcination at a temperature between 250° C. and 1000° C., wherein the aluminum oxide can be hydroxylated.

The present invention provides a new route to the synthesis of semi-crystalline materials with disordered mesopores. The compositions produced in the current invention are distinguished from those of the prior art by the virtue of the method of preparation of the present invention, the subsequent architecture and range of the mesoporous aluminas. Formation of the mesoporous network is accomplished by interaction (complexation and/or hydrogen-bonding) between a nonionic, preferably polyethylene oxide based, surfactant template and neutral inorganic aluminum hydroxide precursors, followed by hydrolysis and subsequent condensation of the inorganic reaction product under either ambient or elevated temperature reaction conditions and the subsequent removal of the solvent phase and the surfactant.

As set forth in the Condensed Chemical Dictionary (1981), the term "peptization" or "peptizing" means "stabilization of hydrophobic colloidal sols by addition of electrolytes, which provide the necessary electric double layer of ionic charges around each particle". Such electrolytes are known as peptizing agents. The ions of the electrolyte are strongly adsorbed on the particle surfaces. Stable sols of non-ionizing substances formed by the addition of an acid or a base acquire a charge in contact with water by preferential adsorption of the hydronium hydroxyl ions, which may be considered peptizing agents.

Strictly speaking, the term "alumina" refers to composition comprising aluminum and oxygen. Corundum or a-alumina is one example of a crystalline alumina. More generally, the term alumina also is used in referring to compositions comprising aluminum, oxygen, hydroxide ions and water. Thus, the compound known as alumina trihydrate is a hydroxide of aluminum with the composition $Al(OH)_3$, which can be empirically expressed as $Al_2O_3 \cdot 3H_2O$ or as a "trihydrate of alumina". The transition alumina pseudobohmite is a semi-crystalline alumina comprising microdomains of boehmite, also known as δ-alumina, with the composition $AlO(OH)$. Alumina compositions can be amorphous, as well as crystalline or a mixture of crystalline and amorphous phases. Amorphous aluminas lack crystallographic order and do not exhibit x-ray diffraction properties indicative of atomic periodicity. These amorphous forms of alumina can be obtained as sols and gels and as precipitates from solutions of soluble aluminum cations. In general, amorphous forms of alumina are more reactive towards acids and bases than crystalline aluminas. The acid/base reactivity of amorphous aluminas is a highly desirable property for the purposes of the present invention. Amorphous sols, gels and precipitates of alumina are preferred precursors to the mesostructured forms of the porous, alumina compositions prepared by the nonionic surfactant assembly methods of the present invention. The preferred amorphous aluminas can be commercially available products, several of which are described in the Examples of the present invention. Also, soluble salts of aluminum are used to form alumina gels that are precursors to the mesostructured aluminas of the present invention. Included in the preferred forms of soluble aluminum are polycations of aluminum, particularly aluminum chlorohydrol. This latter salt, also known as aluminum chlorohydrate and supplied commercially by Reheis Corporation, comprises aluminum polycations of the type $Al_{13}O_4(OH)_{24}^{7+}$ and chloride anions. Polycations solutions of aluminum containing $Al_{13}$ oligomers and even higher oligomers formed by condensing two or more $Al_{13}$ oligomers can be obtained by adjusting the pH and aging conditions of aluminum chloride or aluminum nitrate solutions (Fu, et al., Chem. Mater. 3, 602–610 (1991)). Salts of $Al_{13}$ oligomers containing nitrate rather than chloride counter anions are referred to as aluminum nitrohydrate. Some definitions of alumina compositions as set forth in the Condensed Chemical Dictionary (1981) are as follows:

(1) alumina, activated—A highly porous, granular form of aluminum oxide having preferential adsorptive capacity for moisture and odor contained in gases and some liquids. When saturated, it can be regenerated by heat (176–315° C.). The cycle of adsorption and reactivation can be repeated many times. Granules range in size from powder (7 microns for chromatographic work) to pieces about 1½" diam. Average density about 50 lb/cu ft. An effective desiccant (q.v.) for gases and vapors in the petroleum industry. It is also used as a catalyst or catalyst carrier; in chromatography; and in water purification. See also aluminum oxide.

(2) alumina trihydrate—(aluminum hydroxide; aluminum hydrate; hydrated alumina; hydrated aluminum oxide) $Al_2O_3 \cdot 3H_2O$ or $Al(OH)_3$.—Properties: White crystalline powder, balls or granules; sp. gr. 2.42; insoluble in water; soluble in mineral acids and caustic soda. Noncombustible. —Derivation: From bauxite; the ore is dissolved in strong caustic and aluminum hydroxide precipitated from the sodium aluminate solution by neutralization (as with carbon dioxide) or by autoprecipitation (Bayer process, q.v.).

(3) aluminum chlorohydrate.—$[Al_2(OH)_5Cl]_x$. An ingredient of commercial antiperspirant and deodorant preparation. Also used for water purification and treatment of sewage and plant effluent.

(4) aluminum hydroxide gel—(hydrous aluminum oxide; alumina gel) $Al_2O_3 \cdot xH_2O$.—Properties: White, gelatinous precipitate. Constants variable with the composition; sp. gr. about 2.4. Insoluble in water and alcohol; soluble in acid and alkali. Nontoxic; noncombustible.—Derivation: By treating a solution of aluminum sulfate or chloride with caustic soda, sodium carbonate or ammonia; by precipitation from sodium aluminate solution by seeding or acidifying (carbon dioxide is commonly used).—Grades: Technical; C.P.; U.S.P. (containing 4% $Al_2O_3$); N.F. (dried, containing 50% $Al_2O_3$).

(5) aluminum oxide—(alumina) $Al_2O_3$. The mineral corundum (q.v.) is natural aluminum oxide, and emery, ruby, and sapphire are impure crystalline varieties. The mixed mineral bauxite is a hydrated aluminum oxide. Properties: Vary according to the method of preparation. White powder, balls or lumps of various mesh. Sp. gr. 3.4–4.0; m.p. 203° C.; insoluble in water; difficultly soluble in mineral acids and strong alkali. Noncombustible; nontoxic. See also alumina trihydrate; aluminum hydroxide gel. Derivation: (a) Leaching of bauxite with caustic soda followed by precipitation of a hydrated aluminum oxide by hydrolysis and seeding of the solution. The alumina hydrate is then washed, filtered and calcined to remove water and obtain the anhydrous oxide. See Derivation under alumina trihydrate. (b) Coal mine waste waters are used to obtain aluminum sulfate, which is then reduced to alumina. Grades: Technical; C.P.: fibers; high purity; fused; calcined. Containers: Multiwall paper sacks; drums; barrels. Hazard: Toxic by inhalation of dust. Tolerance, 10 mg per cubic meter of air. Uses: 7; Production of aluminum; manufacture of abrasives, refractories, ceramics, electrical insulators, catalyst and catalyst supports; paper; spark plugs; crucibles and laboratory wares; adsorbing gases and water vapors (see alumina activated); chromatographic analysis; fluxes; light bulbs; artificial gems; heat-resistant fibers; food additive (dispersing agent). See also alumina, activated.

The present invention particularly provides a *preferred nonionic surfactant assembly route to the preparation of quasi-crystalline mesostructured alumina compositions comprising (a) preparing a homogeneous solution or emulsion of a nonionic polyethylene oxide-based surfactant by stirring, sonicating or shaking at standard temperature and pressure (STP); (b) addition of one or more inorganic aluminum reagents as precursors with stirring at standard temperatures and pressures (STP) to the solution or emulsion of step (a) at 0 to 100° C. to form a precipitated semi-crystalline product; (c) separating the solvent and the hydrolyzing agent from the precipitated product by filtration or centrifugation; (d) optionally calcining the quasi-crystalline product at 200° C. to 900° C. preferably for at least 4 hours in air or (e) extracting the template through solvent extraction whereby the solvent is preferably either water or ethanol.

The present invention thus provides a new route to quasi-crystalline alumina materials with disordered arrangements of framework mesopores that can be utilized as adsorbents, catalysts and catalyst supports for the conversion of organic substrates. The present invention is distinguished from the prior art by the new preparative method used to obtain the mesoporous quasi-crystalline alumina materials, the pore morphology of the said materials, the range of mesostructured porous aluminas, and stabilized forms of these aluminas through the incorporation of rare earth ions, barium ions, and phosphate ions into their structure. The stabilization of aluminas that are not mesostructured by the incorporation of rare earth elements has been described by (Church, et al., Applied Catal., 101, pp. 105–116 (1993)), (Burtin, et al., Applied Catal., 34 pp. 225–238 (1987)) and by (Schaper, et al., Applied Catal., 7 pp. 211–220 (1983)). Transition metal ions at doping levels of 1.0 mole % to 15 mole % and other elements also may be substituted into the framework of the alumina and then to serve as catalyst centers for chemical conversions. The level of metal ion substitution is between about 0.5 and 15 mole percent, more preferably between 5 and 10 mole percent.

Although aluminas are widely used as industrial catalysts and catalyst supports, all of these known materials possess only textural pores and lack the regular framework-confined porosity of a molecular sieve. The present invention uses low cost, non-toxic and recyclable polyethylene oxide based surfactants to prepare new mesoporous alumina molecular sieves with properties of potential commercial importance to petroleum refining. Textural porous aluminas already enjoy an especially important role in Fluid Catalytic Cracking (FCC) (of petroleum) microsphere technology. One of the major functions of alumina is to trap metal ion contaminants in the feed, particularly nickel. Alumina also mediates the porosity of the microsphere and moderates the Bronsted/Lewis acidity. These latter factors help control the light gases and coke make of the cracking reactions and the catalyst deactivation rate. Substantial improvements in FCC cracking performance can be realized by adding new molecular sieve functionality to the alumina components. In addition to tailoring the pore structure and shape selectivity of these new molecular sieves, modifiers (e.g. zirconium and other metallic elements) can be incorporated into the aluminas in order to mediate the acidity under FCC, hydrotreating and mild hydrotreating conditions. The pore structure of these new sieves is sufficiently large to support monolayers of $MOS_2$ for improved hydrotreating applications. The alumina molecular sieves are particularly useful for heavy residual cracking (i.e., the heavier fractions of petroleum not processable by conventional zeolite-based catalysts); mild hydrocracking of petroleum (low $H_2$ pressure); and hydrocracking (high $H_2$ pressure) of petroleum.

According to the method of the present invention, the formation of the mesoporous alumina accomplished by interaction (complexation and/or hydrogen bonding) between structure directing surfactant molecules within micellar aggregates of nonionic polyethylene oxide-based templates and inorganic aluminum reagents as precursors, followed by hydrolysis and cross linking of $IO_x$ units, where I is aluminum coordinated to x oxygen atoms (x=4, 5 or 6). The inorganic aluminum reagents are aluminum salts selected from the group comprising aluminum nitrate, aluminum chloride, aluminum perchlorate, aluminum sulfate, aluminum acetate, aluminum chlorohydrate, aluminum nitrohydrate, and dimeric and polymeric forms thereof, amorphous forms of alumina selected from a group comprising amorphous alumina gel, amorphous alumina sol, amorphous aluminum hydroxide, and amorphous flash calcined gibbsite or aluminum trihydrate, and a poorly crystallized class of aluminas known as transition aluminas. The interaction between the alumina precursor and the nonionic surfactant is most likely to occur between the I—OH unit and the array of lone pair electrons on the surfactant polar segment. The polar segment of the surfactant in the present invention is flexible and appears to act in the fashion of a crown ether complexing a I—OH unit, thereby stabilizing a site of nucleation for subsequent condensation of the mesoporous quasi-crystalline alumina product, although the inventors do not want to be bound to any particular theory.

The said inorganic aluminum salts that are used as the alumina precursors in this invention are dissolved in water and combined with the desired nonionic surfactant in the presence of a base to adjust the pH of the reaction mixture between 4.5 and 8.0, more preferably between 5.5 and 7.0, for periods of up to several days, more preferably, for 4 to 16 hours, at temperatures between 0 and 100° C., more preferably between 35 and 85° C. Alternatively, the aluminum salt solution may be treated with a base to form an amorphous alumina precipitate or gel, which is then peptized and mixed with the desired nonionic surfactant and allowed to react at the said pH and temperature ranges.

The said amorphous forms of alumina re preferred inorganic aluminum reagents for the purposes of this invention, because they are commercially available at low cost and they are reactive toward acids and bases, which allows for their restructuring into the objects of this invention; namely, mesostructured alumina compositions with framework confined mesopores in the presence of nonionic surfactants as structure directors. Well crystallized alumina phases such as corundum, boehmite, and diaspora are not suitable aluminum reagents because they lack the desired reactivity for restructuring into alumina mesostructures in the presence of nonionic surfactants. The said amorphous forms of alumina suitable as reagents for the purposes of this invention may be regarded as "reactive" or "activated" aluminas. Examples of these reactive or activated amorphous aluminas include a dry aluminum hydroxide gel supplied by Chattem Chemicals, an experimental alumina sol supplied by Nalco, and a flash calcined gibbsite supplied as "CP Alumina" by Alcoa. Flash calcined aluminas have been described by (Tanev and Vlaev, Catal. Lett., 19 pp. 351–360 (1993)).

Poorly crystalline, "transition aluminas" contain a reactive alumina component that can be restructured into the mesostructured alumina compositions of the present invention. In an article entitled "Oxides and Hydroxides of Aluminum", Alcoa Technical Paper No. 19, Revised, Karl Wefers and Chanakya Misra describe on pages 48 to 63 several transition aluminas formed by the thermal decomposition of aluminum hydroxides. These poorly crystallized forms exhibit only a few broad x-ray diffraction peaks. The teachings of the present invention demonstrate that the reactive component of a typical transition alumina known as pseudoboehmite can be transformed into a mesostructured alumina containing framework confined mesopores.

The inventors know of no prior art teaching the preparation of alumina compositions containing framework micro-, meso-, or macro-pores by such a nonionic surfactant mechanism involving assembly of alumina precursors, which are totally inorganic and do not contain an alkoxide, around well defined micelles as well as liquid crystal phases of nonionic surfactants. Specifically, the present result is achieved by using micelles as well as liquid crystal phases of a nonionic surfactant to template and assemble an alumina precursor and the dopant elements into a mesoporous framework structure. Complexation and/or hydrogen bonding between the surfactant and the aluminum reagent is believed to be the primary driving force of the assembly of the framework in the current invention. The aforementioned method consists of the formation of a solid precipitate by the mixing of a solution or emulsion of a polyethylene oxide-based nonionic surfactant, with an aluminum precursor which is totally inorganic and does not contain an alkoxide. The template may be recovered by extraction with alcohol at ambient temperature or with hot water whose temperature exceeds the cloud point of the template. Complete removal of the remainder of the template and final crosslinking of the $IO_x$ framework is accomplished by calcination in air at temperatures between 400 and 900° C., usually for 4 h.

The molar ratio of the inorganic aluminum reagent to nonionic surfactant is preferably between 1:1 and 50:1, more preferably 5:1 and 20:1, depending upon the specific template being used. The concentration of surfactant is typically between 0.003 mol L-1 and 0.4 mol $L^{-1}$, again depending upon the surfactant being used and the pore size desired.

The semi-crystalline hydroxylated alumina composition of the present invention preferably has the formula:

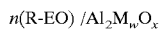

wherein $Al_2M_wO_x$
is written in anhydrous form being represented, wherein R-EO is at least one of a selection of nonionic alkyl, or alkyl/aryl polyethylene oxide surfactant or polyethylene oxide-polypropylene oxide-polyethylene oxide block co-polymer surfactant wherein when R-EO is present n is between about 0.04 and 2; M is at least one element selected from the group comprising P, Ba, Y, La, Ce, Sn, Ga, Si, Zn, Co, Ni, Mo and Cu and w, and x are the molar stoichiometries of M and 0, respectively, wherein in the composition when calcined, n is about 0; w is 0 to 0.30; x is 3.0 to 3.6.

R-EO is selected from the group comprising nonionic alkyl polyethylene oxide, alkyl and aryl polyethylene oxide, and polyethylene oxide polypropylene oxide polyethylene oxide block co-polymer molecules; and wherein when (R-EO) is present, n is between about 0.04 and 2; and v and x are the molar stoichiometries of the dopant M and oxygen, respectively, such that in the composition when calcined, n is about 0, w is 0 to 0.30 and x is 3.0 to 3.6.

The semi-crystalline mesoporous aluminas of the present invention may be described as being formed by hydrogen-bonding between the terminal hydroxyl function or the array of lone pair electrons on the 0 atoms of the ethylene oxide units of the template molecules and hydroxyl groups on the alumina precursor. This H-bonding is followed by further hydrolysis of the alumina precursor and subsequent condensation and cross-linking of AlOH units under ambient or elevated temperature reaction conditions to form a $IO_x$ framework containing terminal AlOH groups and oxygen atoms bridging two or more I centers (where I=Al and M). Specifically, the said method comprises the formation of an inorganic solution by the mixing of an aqueous solution of dispersion of nonionic surfactant with the inorganic aluminum hydroxide solution, followed by aging and subsequent precipitation under shaking, stirring or quiescent conditions.

The composition of this invention is characterized by at least one strong XRD peak at a basal spacing ($d_{100}$) of at least 3.0 nm or larger. The designation $d_{100}$ is arbitrary and not intended to imply any long range hexagonal, cubic or lamellar order for the compositions. The compositions are also distinguished in part from those of the prior art, specifically hexagonal, cubic, and lamellar materials, by the disordered assembly of the mesoporous alumina framework.

In the present invention, the surfactant may be removed from the condensed reaction products in at least three different ways: (i) air drying followed by calcination in air or in an inert gas preferably at a temperature from 400 to 700° C. for 4 to 6 h; (ii) solvent extraction of the template from the air dried material using alcohol or hot water; (iii) a combination of procedures (ii) and (i).

Procedure (i), when conducted in air, results in the complete oxidation and thereby decomposition of the occluded surfactant. The current invention improves on the environmental impact of the prior material preparation art, as the oxidation products of quaternary ammonium and amine based surfactants described in the prior art, include environmentally undesirable $NO_x$ gases. while the oxidation products of polyethylene oxide based surfactants are the more environmentally compatible $H_2O$ and $CO_2$ gasses. Procedure (ii) allows the surfactant to be recovered and subsequently recycled and reused. If the surfactant is removed by procedure (ii), the product should be calcined in air or inert gas to remove the final traces of the template and to complete the cross linking of the mesostructure.

After calcination, the present compositions may be used as adsorbents, molecular sieves, catalysts and catalyst supports. When the calcined framework is appropriately substituted with functional metallic, non-metallic or metalloid elements or subsequently impregnated as taught in Ger. Pat. (DD) No. 286,522, with the correct amount of a catalytically active element, such as Sn, Si, Ga, Al, Rh, Nb, Re, Ag, Cu. Cr, Pt, Pd, Ti, V, Zr, Zn, Co, Mo, Ni, Cu or mixtures thereof, or when intercalated with transition metal inorganic metallocycles, it can be used as a catalyst component for cracking, hydrocracking, hydrogenation-dehydrogenation, isomerization or oxidations involving large and small organic substrates. Preferably, the molar ratio of deposit to alumina is between 0.005 and 0.15 to 1.

The new synthesis method of the compositions of this invention involves the preparation of solutions or emulsions of a structure-directing surfactant template compound and reaction of this solution with the inorganic alumina precursor under stirring, sonication, shaking, or quiescent conditions until formation of the desired precipitated product is achieved and recovering the mesoporous alumina product. The template is described more particularly as a nonionic (neutral) polyethylene oxide based molecule that would possess one of many different molecular structures and the hydrolysing agent is described as water.

Figure 16:
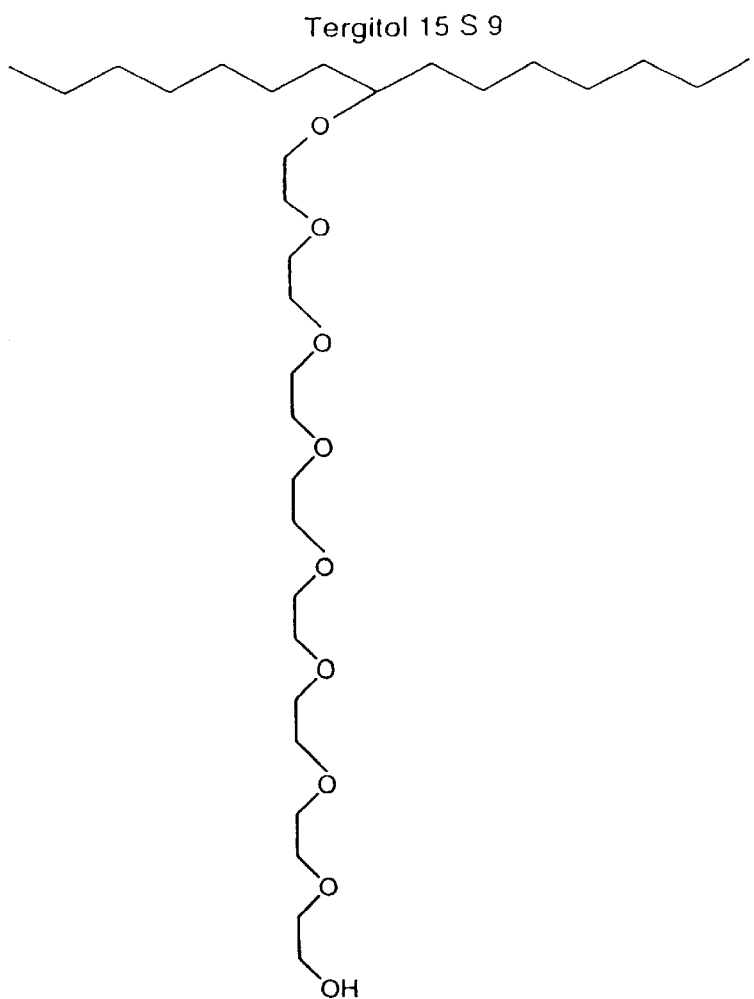
FIG. 16 is a representative chemical structure of a secondary fatty alcohol poly-ethoxylate (TERGITOL).

There are four basic types of surfactant molecules that are specifically described herein. The alkyl-polyethylene oxides; such as are related to the TERGITOL 15-S-m products (FIG. 16) are derived from the reaction of ethylene oxide with a primary or secondary alcohol and possess the basic formula $R_n$—$O(EO)_mH$ where R is a hydrophobic alkyl group with n ranging up to at least 20 carbon atoms, EO is a hydrophilic ethylene oxide unit ($OCH_2CH_2$) with m ranging from about 7 to 40. The BRIJ series of surfactants (ICI) are alkyl polyethylene oxides analogous to TERGITOL surfactants.

Figure 17A:
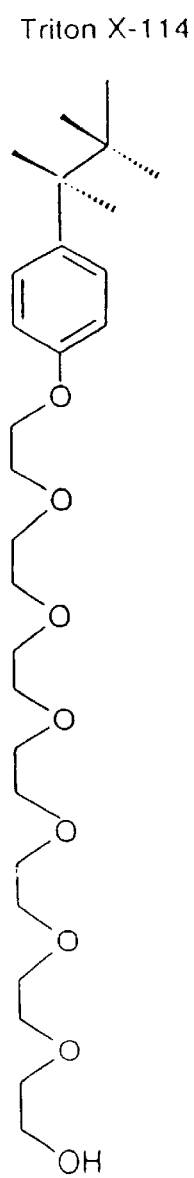
FIG. 17A is a representative chemical structure of an alkyl phenol poly-ethoxylate (TRITON X).
Figure 17B:
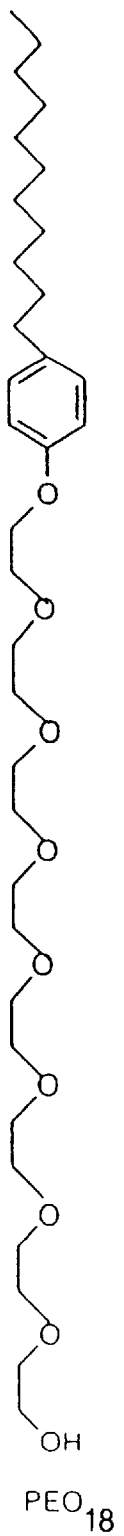
FIG. 17B is IGEPAL RC760.
Figure 18:
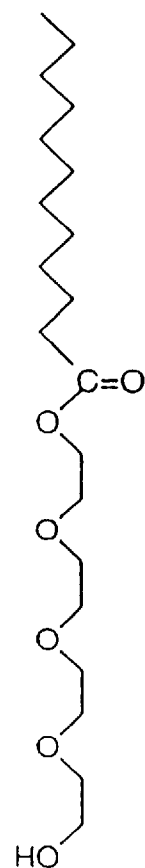
FIG. 18 is a representative chemical structure of a fatty acid ethoxylate.

The alkyl-phenyl polyethylene oxides; such as IGEPAL-RC (FIG. 17B) and TRITON-X (FIG. 17A), possess the same range of structures as the alkyl-polyethylene oxides, with the exception that the primary (IGEPAL RC), secondary or tertiary (TRITON X) R group is bound to the EO units through a hydrophobic phenoxy group (PhO). These molecules then, have the basic formula; $R_n$—Ph—$O(EO)_mH$, preferably where m is 8 to 10 and n is 8. BRIJ is a commercial surfactant structurally related to TERGITOL (ICI, England)

Figure 19:
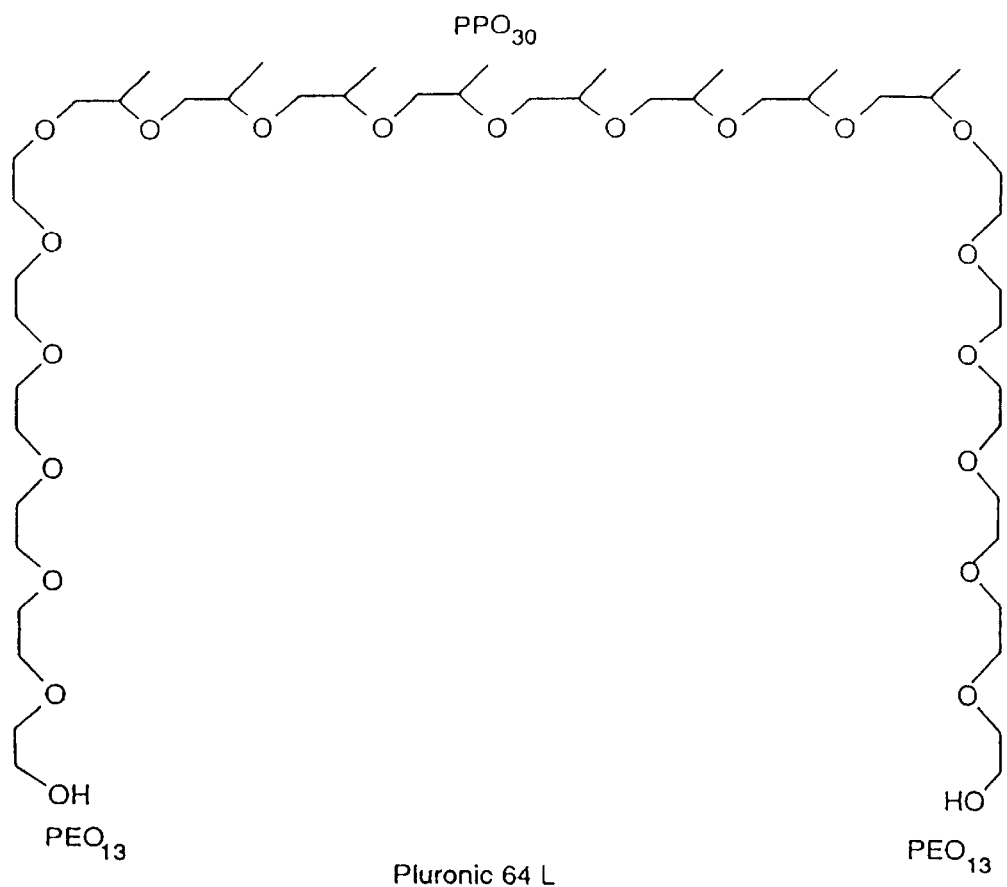
FIG. 19 is a representative chemical structure of an ethylene oxide-propylene oxide-ethylene oxide tri-block copolymer (PLURONIC 64L).

The polyethylene oxide (PEO) polypropylene oxide (PPO) block co-polymers; such as PLURONIC (FIG. 19), are derived from the addition of hydrophobic propylene oxide to propylene glycol followed by the addition of hydrophilic ethylene oxide. They are defined as $PEO_n$—$PPO_m$—$PEO_n$ tri-block co-polymers wherein n is controlled by length to constitute from 10% to 80% by weight of the final product. The order of the PEO and PPO units may be reversed in order to produce the $PPO_m$—$PEO_n$—$PPO_m$ triblock co-polymers, such as Pluronic-R surfactants.

Figure 20:
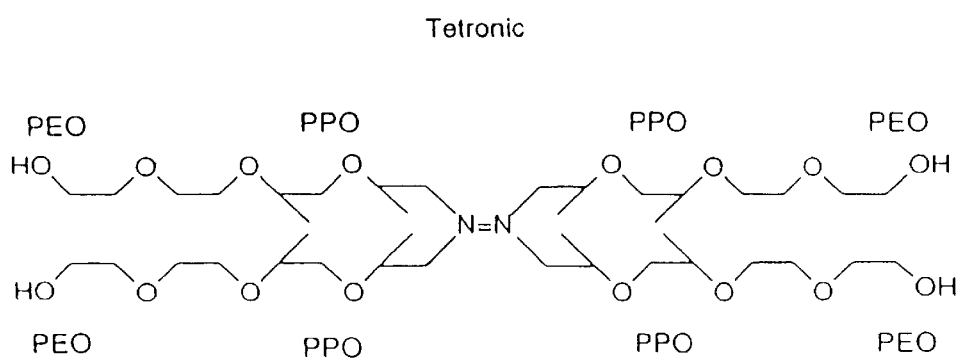
FIG. 20 is a representative chemical structure of the ethylene diamine propylene oxide-ethylene oxide derivative (TETRONIC).
Figure 21:
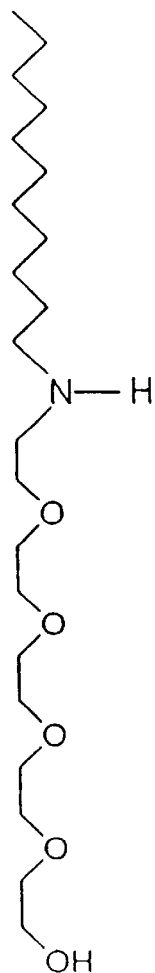
FIG. 21 is a representative chemical structure of a primary fatty amine poly-ethoxylate.
Figure 22:
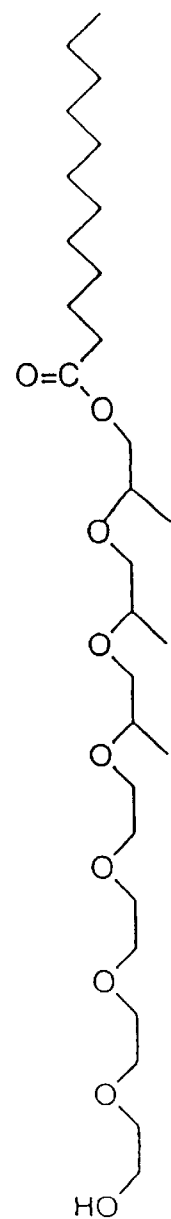
FIG. 22 is a representative chemical structure of a fatty acid PPO/PEO block co-polymer.
Figure 23:
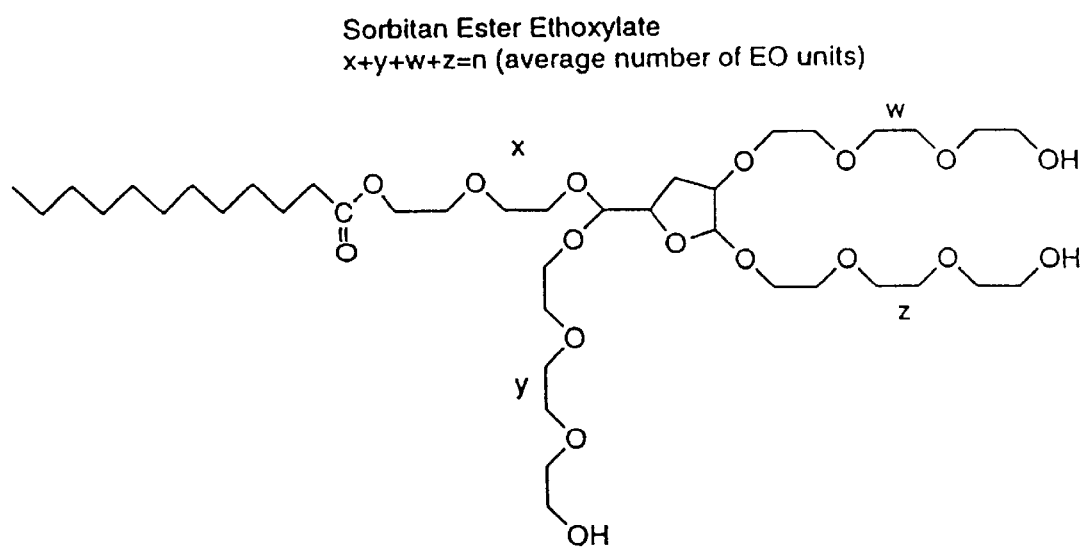
FIG. 23 is a representative chemical structure of a sorbitan ethoxylate.

A fourth basic PEO based surfactant type is derived by from the substitution of the hydrogens of ethylene diamine by ethylene oxide and propylene oxide units to form the X shaped, Tetronic, molecules (FIG. 20) with basic formula; $((EO)_n—(PO)_m)_2NCH_2CH_2N—((PO)_m—(EO)_n)_2$. The order of the PEO and PPO groups in these molecules may also be reversed to form Tetronic-R.

Those skilled in the art will recognize that nonionic surfactants capable of bonding to inorganic aluminum precursors through complexation or through hydrogen bonds to Al—OH or Al—O linkages can be suitable substitutes for PEO-based surfactants. PEO based surfactants generally have the advantages of low cost, non-toxicity, and biodegradability.

The reaction of inorganic alumina precursor and the surfactant solution is achieved at a temperature in the range 0 to 100° C., more preferably 35–85° C., under shaking, stirring or quiescent conditions for at least 16 h.

Aging of the reaction mixture may be achieved at room temperature either under stirring, sonication or shaking or by being left to stand for about 24 h. More specifically, the assembly of the mesostructures occurs through complexation or H-bonding between the neutral nonionic surfactant and the inorganic aluminum oxide precursors, together with hydrolysis and crosslinking of the $IO_x$ units at ambient or elevated reaction temperatures. The bonding by complexation most likely occurs between the aluminum centers of the precursor and the oxygen electron lone pairs of the ethylene oxide groups in the hydrophilic head group of the surfactant molecules. Hydrogen bonding between the precursor Al-OH and surfactant EO groups or between precursor Al-O and surfactant OH or $NH_2$ terminal groups is also possible.

The calcination is performed in a temperature controlled oven by heating in air at a rate of 2° K. $min^{-1}$ to a final temperature between 673° K. and 1173° K. for at least 30 min, more preferably 4 to 6 h.

The outstanding features of the present invention are:
(i) The use of nonionic (N°) polyethylene oxide based templates, to assemble disordered mesoporous alumina frameworks;
(ii) The reaction of low cost aluminum reagents as precursors to obtain polymerized mesostructured alumina frameworks containing Al—O—Al and Al—OH bonds;
(iii) The use of hydrogen bonding or non-electrostatic complexation as the driving force for the neutral assembly of the nonionic template and the inorganic oxide precursor species;
(iv) The use of convenient reaction conditions to prepare the templated product;
(v) The recovery and recycling of the surfactant through simple solvent extraction from the product.
(vi) The use of low cost, non-toxic, biodegradable reagents and low energy requirement preparation art.

The assembled mesostructured aluminas of the present invention can be combined with other components, for example, zeolites, clays, inorganic oxides or organic polymers or mixtures thereof. In this way adsorbents, ion-exchangers, catalysts, catalyst supports or composite materials with a wide variety of properties can be prepared. Additionally, one skilled in the art can impregnate or encapsulate transition metal macrocyclic molecules such as porphyrins or phthalocyanines containing a wide variety of catalytically active metal centers.

Additionally, the surfaces of the compositions can be chemically functionalized in order to produce catalytic, hydrophilic or hydrophobic surfaces. The surfaces may be functionalized after synthesis by reaction with various metal salts, organometallic reagents, silylation reagents, or alkylating reagents.

In the examples below x-ray diffraction patterns were obtained with a RIGAKU ROTAFLEX diffractometer equipped with a rotating anode and Cu—$K_\alpha$ radiation ($\lambda$=0.15418 nm). The TEM image was obtained with a JEOL 100CX microscope using an accelerating voltage of 120 kV and a 20 $\mu$m objective lens aperture. $N_2$ isotherms were obtained on a COULTER OMNISORP 360CX Sorptometer and a micromeritic ASAP-2010 sorptometer operated under continuous adsorption conditions. Framework confined mesopore sizes were determined by Barrett-Joiner-Halender (BJH) analysis of the $N_2$ desorption isotherm and Horvath-Kawazoe analysis of the adsorption isotherm. Surface areas were determined by the BET method. $^{27}Al$ MAS NMR spectra were obtained using a VARIAN VXR-400 NMR spectrometer equipped with a VARIAN MAS probe and SiN rotor. The spectrometer frequency was 104.22 MHz pulse width 2 ms, and sample spinning rate 6550 Hz.

Most previously reported studies of mesoporous molecular sieves have made use of the Horvath-Kawazoe (HK) model (Horvath, G., et al., J. Chem. Eng. Jpn. 16, 470 (1983)) for the determination of pore size distributions from $N_2$ adsorption isotherms. This model, developed for microporous lamellar carbons, assumes slit-like micropores. Therefore, its applicability to materials with larger, cylindrical mesopores is likely to be limited, particularly at pore sizes above 5.0 nm. In this invention, we have applied in addition to the HK model the Barrett-Joyner-Halender (BJH) (Barrett, E P., et al., J. Amer. Chem. Soc. 73, 373 (1951)) models to the determination of framework pore size, particularly for pore sizes above 6.0 nm.

The following is a schematic summary of the precipitate steps used to form mesostructured aluminas from different classes of inorganic aluminum reagents as alumina precursors:

(1) Aluminum Chlorohydrol ACH-Reheis Chemicals (or other oligomeric aluminum salt)

$[Al_{13}O_4(OH)_{24}(H_2O)_{12}^{7+}]$ + nonionic surfactant aqueous solution (e.g. TERGITOL, BRIJ, PLURONIC)

↓ 30 – 85° C.

Alumina/Surfactant Gel

↓ aqueous $NH_4(OH)$ 25° C. (pH = 5.6–7.0)

Alumina/Surfactant Mesostructure

↓ solvent extraction/calcination

Alumina Mesostructure

-continued (2) Aluminum Nitrate (or other alumninum salt)
[AL(NO$_3$)$_3$·9H$_2$O] solution

↓ NH$_4$(OH), 25° C.

[Al(OH)$_3$] precipitate

↓ aqueous HCl (H$^+$/Al$^{3+}$ = 2.5)

Peptized Solution

↓ surfactant, 30–85° C., preferred

Alumina/Surfactant Gel

↓ aqueous NH$_4$OH, 25°
(pH = 5.6–7.0)

Alumina/Surfactant Mesostructure

↓ solvent extract or calcine

Alumina Mesostructure (3) Dry Aluminum Hydroxide Gel, Chattem Chemicals, Chattanooga TN (or other amorphous alumina or a transition alumnina)
(Al(OH)$_3$) dry gel ↓ aqueous HCl (H$^+$/Al$^{3+}$ = 2.5)
45° C.

Peptized Solution

↓ surfactant

Alumina/Surfactant Gel

↓ aqueous NH$_4$OH, 25°
pH = 5.6–7.0

Alumina/Surfactant Mesostructure

↓ solvent extract or calcine

Alumina Mesostructure (4) Pseudoboehmite (Catapal A - Vista)
[AlO(OH)] solid

↓ Aqueous HCl (H$^+$/Al$^{3+}$ ~ 0.7–1.0)
or HNO$_3$

Peptized/suspension

↓ surfactant, 30–85° C.

Alumina/Surfactant Suspension

↓ aqueous NH$_4$OH, 25°
pH = 5.7–7.0

Pseudoboehmite/Alumina/Surfactant Mesostructure

↓ solvent extraction or calcine

Pseudoboehmite/Alumina Mesostructure mixture

The framework-substituted aluminas n(PEO)—Al$_2$M$_w$O$_x$ are prepared by adding the desired dopant to the aluminum precursor prior to the addition of surfactant.

The following are specific examples of the present invention intended to illustrate but not to limit the invention.

EXAMPLES 1–5

These examples illustrate the art for the preparation of mesostructured aluminum oxides using cationic aluminum oligomers as the alumina precursor and alkyl polyoxyethylene surfactants as the structure directing agents. As a specific example (Example 1), 13.0 g of 50 wt % aluminum chlorohydrate aqueous solution (Reheis Chemical Company, (Berkeley Heights, N.J.) was added to 6.5 g of a Tergitol 15-S-7 (Union Carbide, (Danbury, Conn.) in 1.8 g of water under stirring. The resulting homogeneous mixture was then aged and gently shaken in a thermal bath at 30 to 65° C. for 24 h. A clear viscous solution was obtained. Cooling the solution to ambient temperature gave a transparent gel. Then 2.0 ml of aqueous ammonia (37 wt %) was added to the gel, which was allowed to age for 6 h, and then another 1.5 ml of aqueous ammonia (37 wt %) was added. The gel then was mechanically stirred to form a wet white precipitate. The pH of the gel changed from around 4.3 to 6.5. This same procedure was repeated using other TERGITOL surfactants. The molar compositions of the initial reaction mixtures for five example were as follows:

0.077 mole Al$_{13}$O$_4$(OH)$_{24}$Cl$_7$ as a 50% (w/w) solution (Reheis)

0.13 mole of neat liquid TERGITOL 15-S-n (where n=7, 9, 12, 15, 20 and the example is denoted 1, 2, 3, 4, 5, respectively).

1.3 mole H$_2$O 0.55 mole NH$_4$OH as 37% (w/w) solution

Figure 1B:
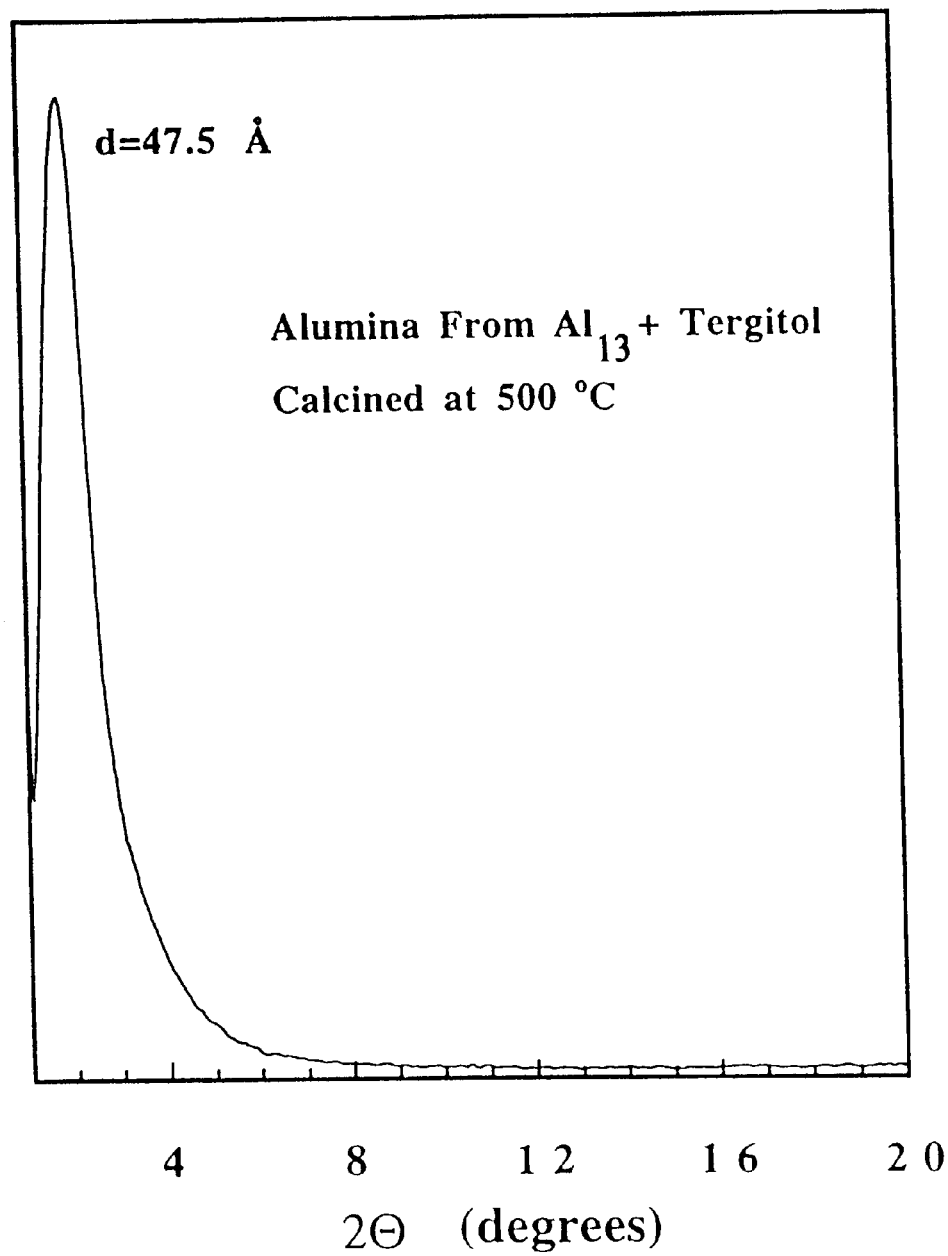
Figure 2:
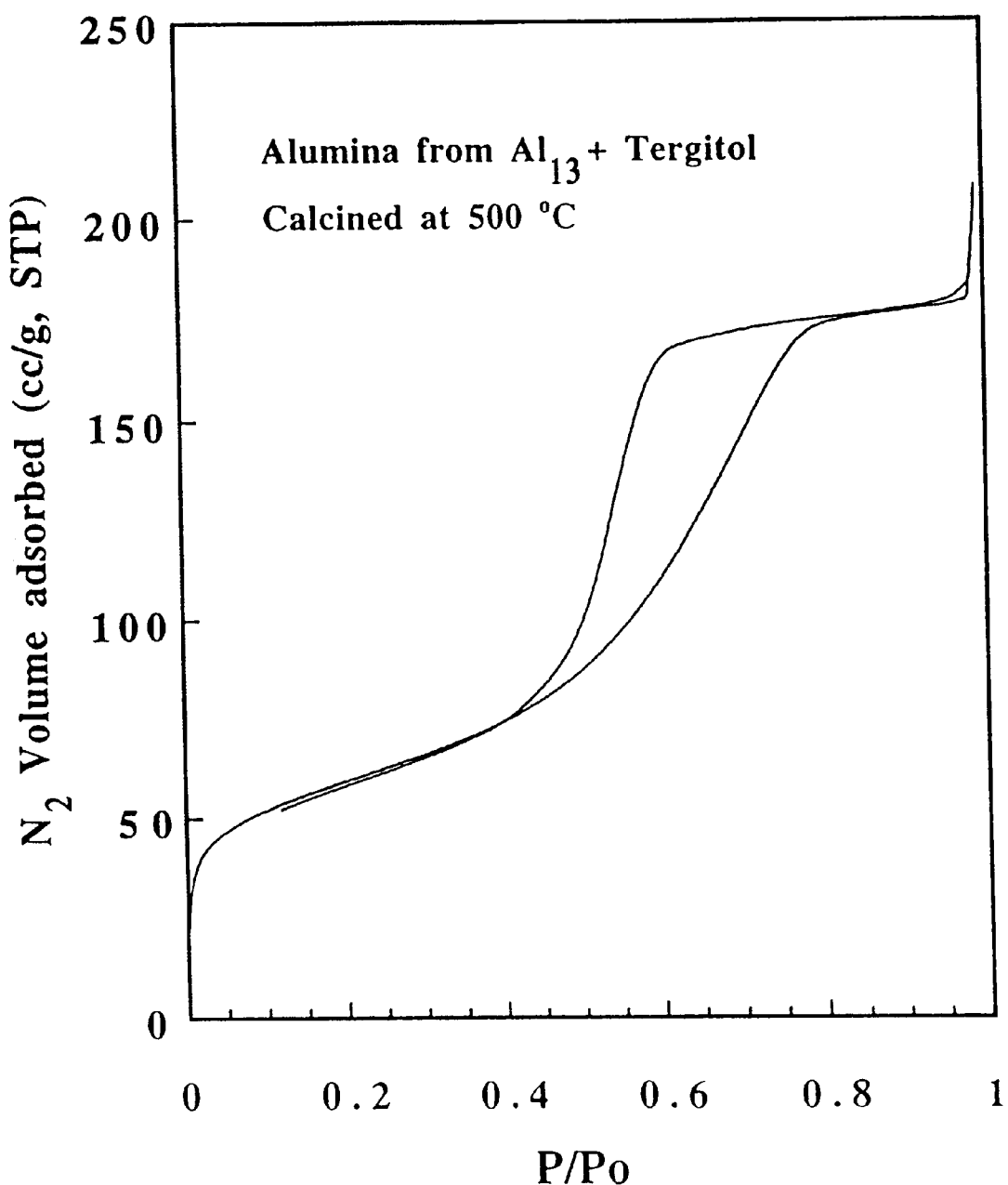
FIG. 2 is a $N_2$ adsorption-desorption isotherm for the 500° C. calcined alumina of Example 1.
Figure 3A:
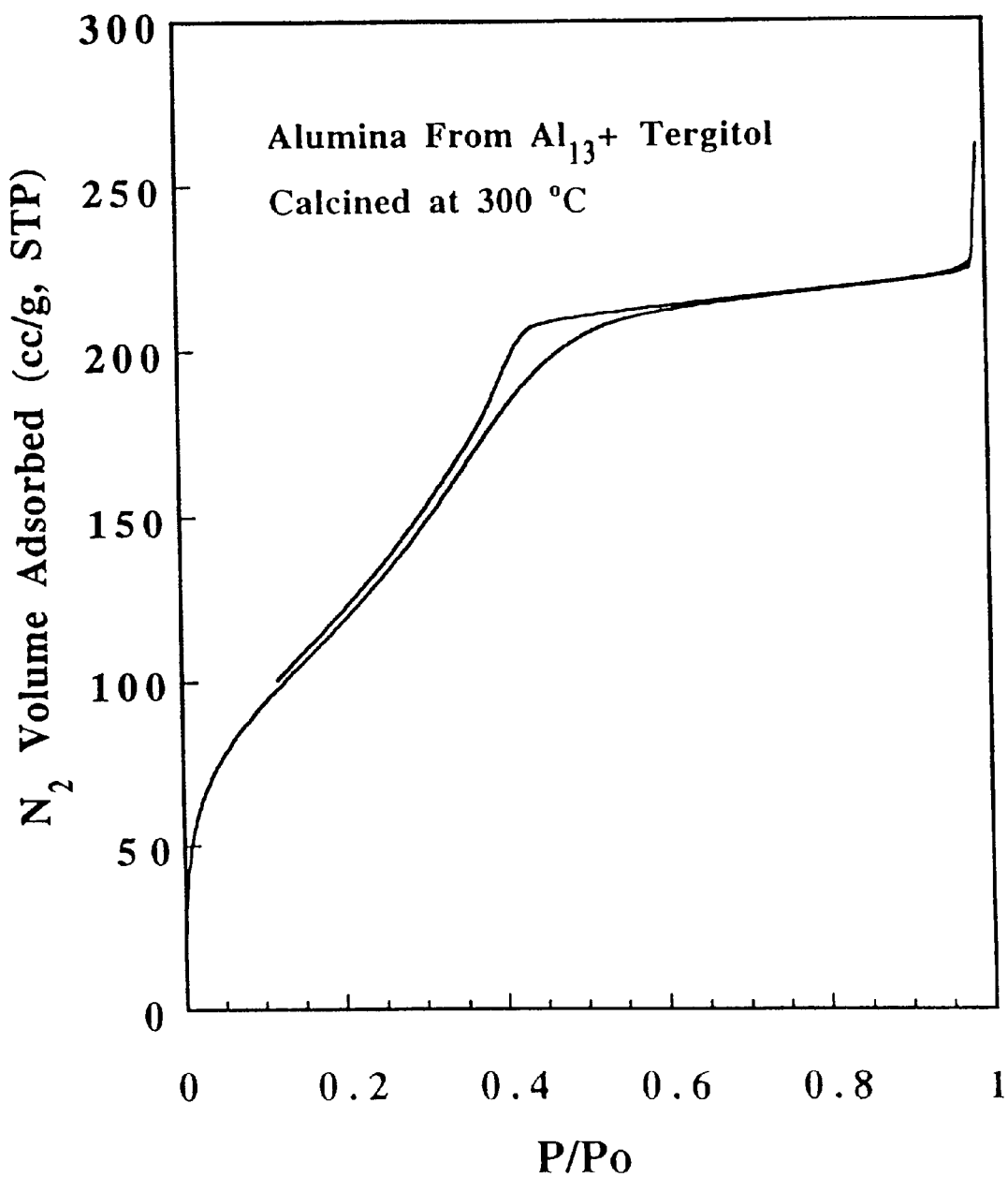
FIG. 3A is a $N_2$ adsorption-desorption isotherm for the 300° C. calcined alumina of Example 1.
Figure 3B:
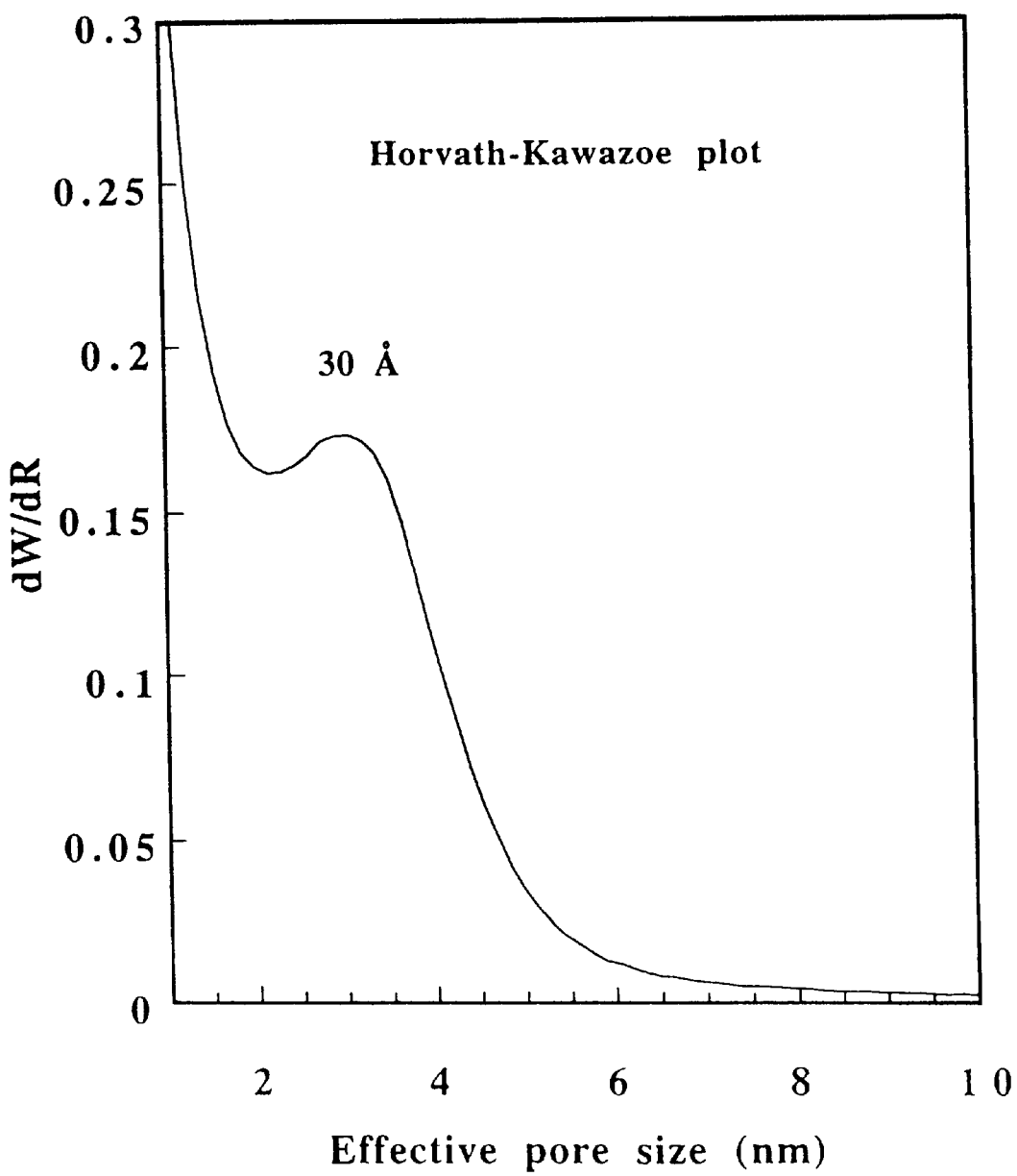
FIG. 3B is a graph showing a Horvath-Kawazoe framework-confined mesopore size distribution curve for the alumina of Example 1.

Each product was first dried in air and then at 100° C. for 6 h, and finally calcined either at 300 or at 500° C. for 4 h. The powder X-ray diffraction patterns were measured on a RIGAKU ROTAFLEX diffractometer equipped with a rotating anode and Cu—K$_\alpha$ radiation. The N$_2$ adsorption-desorption isotherms were measured at –196 C on a COULTER OMNISORP 360CX SORPTOMETER using a continuous adsorption mode. Before measurement, samples were evacuated overnight at 150° C. and 10–5 torr. The d-values for the observed X-ray reflection were in the range 54–62 Å for the as-synthesized samples and 44–52 Å for calcined samples (see FIGS. 1A and 1B). The relatively small differences in d-spacing for the alumina examples prepared from one TERGITOL to another indicated that the d-value is mainly determined by the alkyl chain length, as opposed to the length of the polar head group. All of the calcined samples also exhibited similar N$_2$ adsorption and desorption isotherms with a step centered at P/Po value around 0.50–0.58 (see FIG. 2). The pore size distribution peaks obtained by applying the BJH model to the adsorption isotherms were centered in the range 40–46 Å. The samples calcined at 300° C., which still contained a small amount of carbonized surfactant, exhibited an isotherm step centered at a P/Po value near 0.37 (FIG. 3A), corresponding to a pore size distribution with a maximum at near 30 ≈ (FIG. 3B). The specific surface areas were in the range 400–500 m$^2$/g for samples calcined at 300° C. and 275–325 m$^2$/g for the same samples calcined at 500° C. obviously, the specific surface area was decreased upon calcination at the higher temperature, although the nesostructured framework of the aluminum oxide was in part retained at 500° C. TEM images for all five samples calcined at 500° C. showed a disordered channel structure (see FIGS. 4A and 4B).

EXAMPLES 6–8

The following examples demonstrate the art of preparation of mesostructured aluminum oxides from cationic aluminum oligomers as the stating materials and a polyoxyethylene-polyoxypropylene block co-polymer as the mesostructure directing agent. The same procedures as described in Examples 1 to 5 were used to prepare the mesostructures, but the surfactant was replaced by the Pluronic series surfactants PLURONIC L64, PLURONIC P65 and PLURONIC P84 (BASF). The molar compositions of the initial reaction mixtures were:

0.077 mole $Al_{13}O_4(OH)_{24}Cl_7$ as a 50% (w/w) solution (Reheis)

0.10 mole PLURONIC L64, P65, P84, corresponding to Examples 6, 7 and 8, respectively.

1.3 mole $H_2O$ 0.55 mole $NH_4OH$ as a 37 wt % solution

Figure 5:
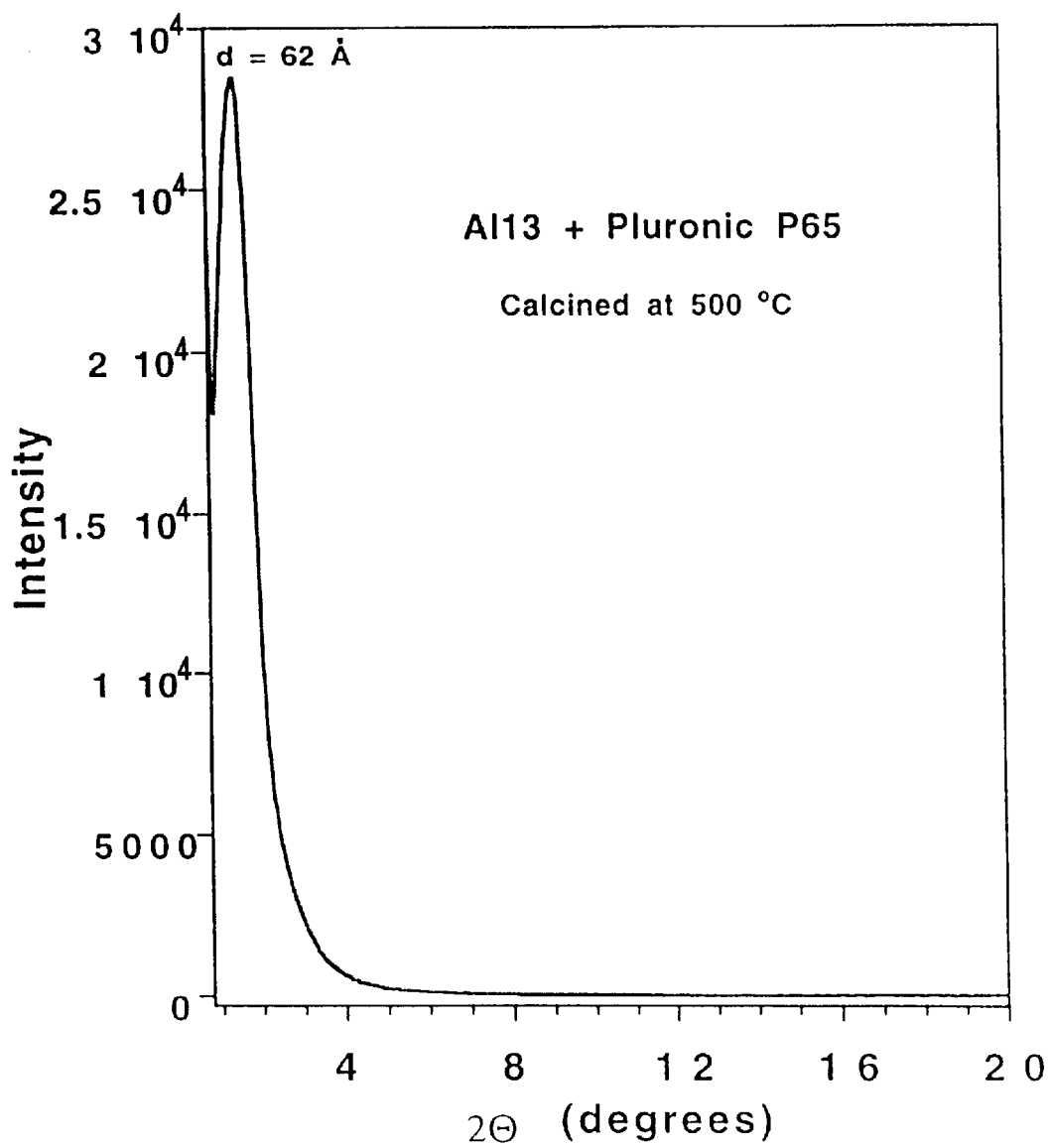
FIG. 5 is an x-ray powder diffraction pattern for the 500° C. calcined alumina of Example 6.
Figure 6A:
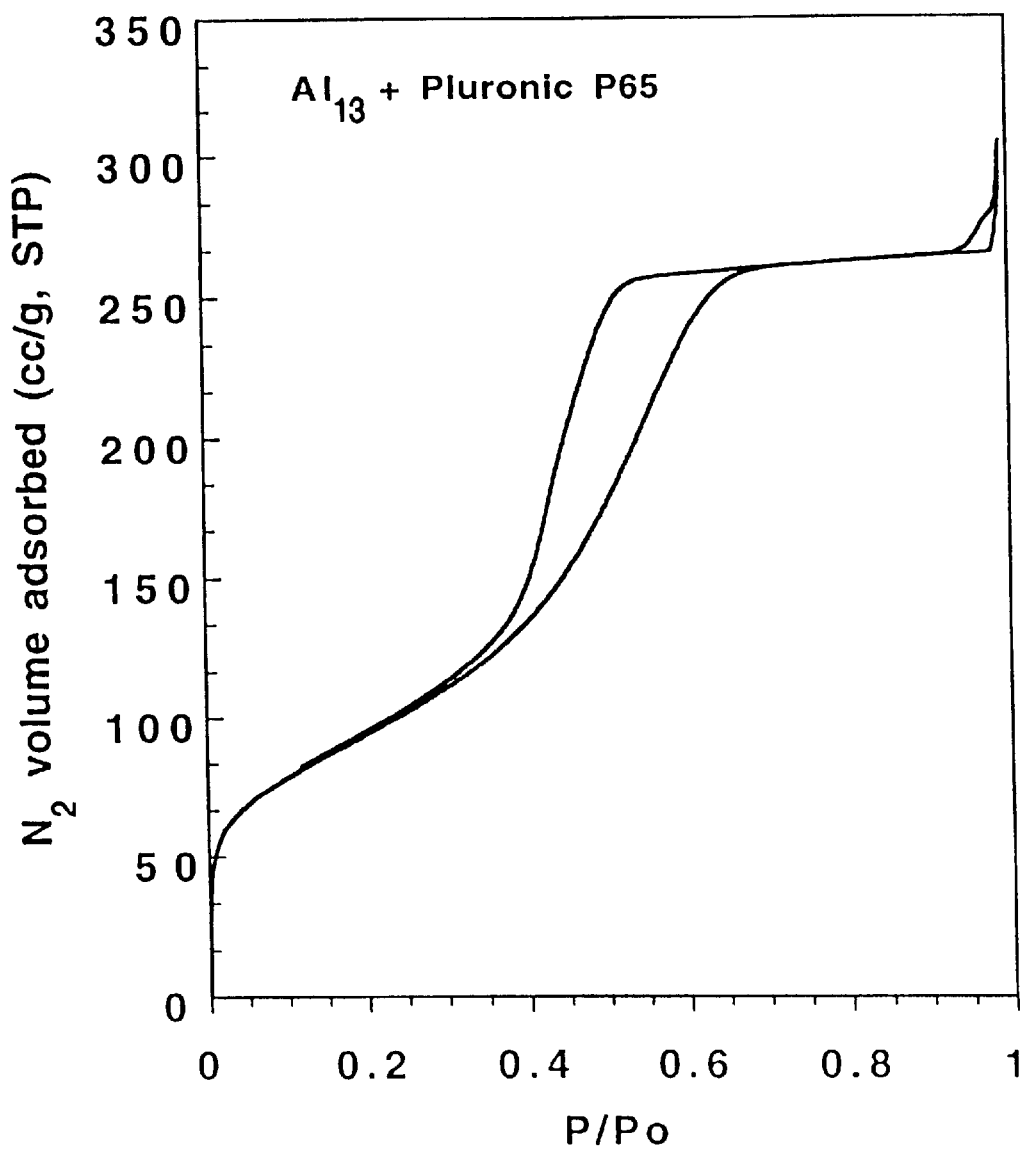
FIG. 6A is a $N_2$ adsorption-desorption isotherm for the 500° C. calcined alumina of Example 6.
Figure 6B:
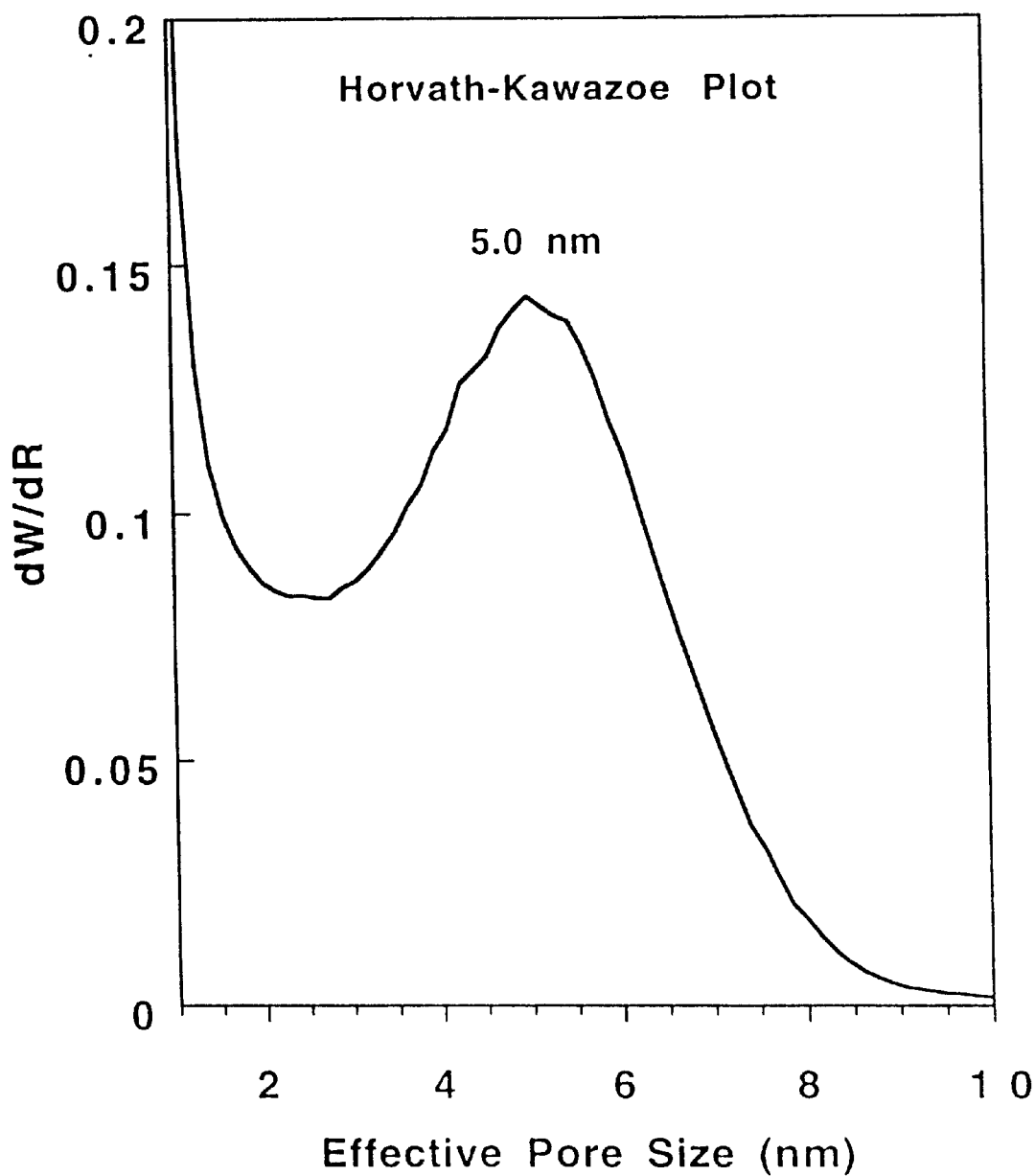
FIG. 6B is a graph showing a Horvath-Kawazoe framework confined mesopore size distribution curve for the calcined alumina of Example 6.
Figure 7:
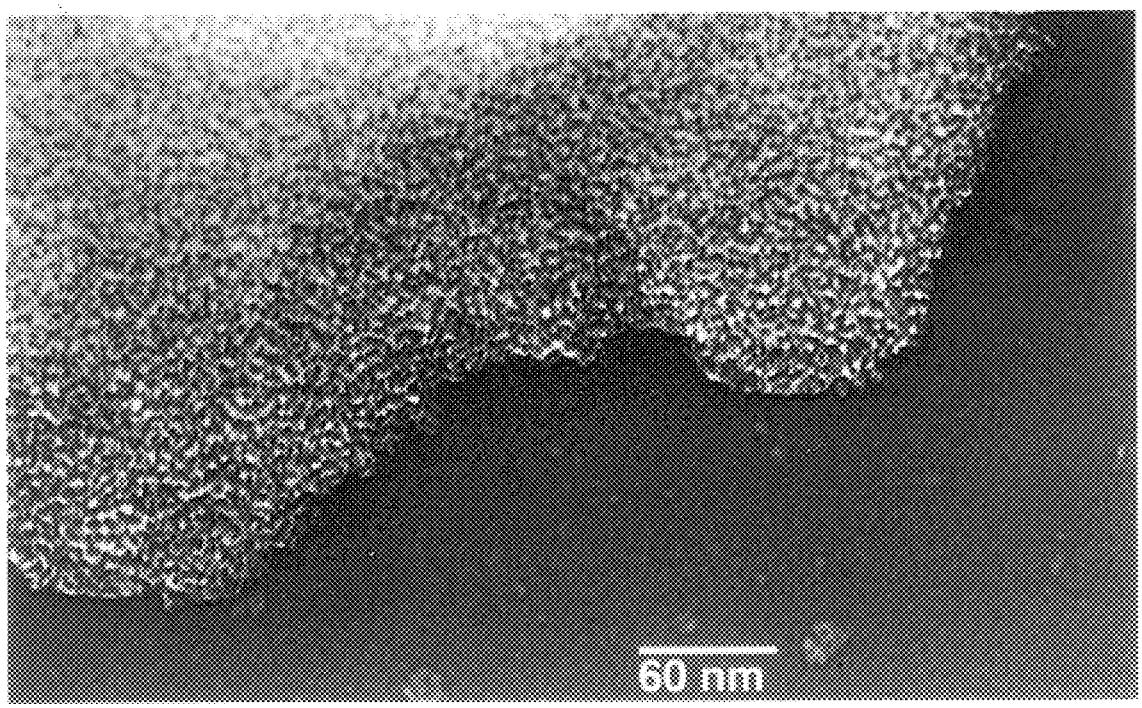
FIG. 7 is a TEM micrograph of the mesoporous alumina of Example 6.

The basal spacings for the observed single X-ray reflection peak were 65, 62, and 80 Å, corresponding to Examples 6, 7 and 8, respectively. FIG. 5 shows a X-ray diffraction pattern of the sample prepared using PLURONIC P65 as the structure directing agent. FIG. 6A and 6B show the $N_2$ isotherms and Horvath-Kawazoe pore size distribution plot, respectively. A clear step centered at P/Po near, 0.5 corresponding to a pore size of 50 Å, is seen. TEM image of the reticulated pore structure is shown in FIG. 7.

The mesoporous alumina molecular sieves obtained in these examples are distinguishable from the worm-hole aluminas according to the prior art of Bagshaw et al, wherein an aluminum alkoxide was used in place of cationic aluminum oligomers as the aluminum source. Table 1 below compares the properties of an alumina prepared by the art of Example 6 with an alumina prepared with the art of Bagshaw.

Pluronic 123 and Pluronic F127 as structure directing agents afforded alumina mesostructures with a d spacing of about 150 Å.

EXAMPLE 10

This example illustrates the preparation of a mesostructured aluminum oxide from an amorphous alumina sol. A typical preparation consisted of mixing 13.8 g of a 10 wt % amorphous alumina sol produced as an experimental reagent by Nalco Chemical Company with 6.75 g of TERGITOL 15-S-9. The resulting mixture was worked-up according to the procedure given in Examples 1–5 to obtain the mesostructured aluminum oxide product the initial molar composition was:

0.5 mole $Al_2O_3$ as a 10 wt % sol 0.4 mole Tergitol 15-S-9

10.0 mole $H_2O$ 0.7 mole $NH_4OH$ as a 37 wt % solution

After aging the reaction mixture at 25 to 65° C., a transparent gel was obtained. Adding aqueous ammonia yielded the as-synthesized mesostructured aluminum oxide. The X-ray diffraction pattern for the sample calcined at 500° C. showed a diffuse peak corresponding to a basal spacing near 78 Å (see FIG. 8). The $N_2$ adsorption and desorption isotherms for the calcined sample exhibited a typical step at P/Po around 0.7. The BET specific area was 157 $m^2/g$.

EXAMPLE 11

This example demonstrates the art for the preparation of mesostructured aluminum oxide prepared from cationic aluminum salts as the aluminum source. The starting salt is selected from the group comprising aluminum nitrate, chloride or acetate. A particular preparation using aluminum nitrate comprised the following steps:

1) 20.4 g of $Al(NO_3)_3 9H_2O$ was dissolved into 100 ml of $H_2O$.

TABLE 1

Comparison of a Nesostructured Alumina Prepared from Cationic Aluminum Oligomer by Example 6 and Wormhole Alumina Prepared from the Prior Art of Bagshaw Using the Same Pluronic 64L as Structure Directing Agent

| | Example 6 Disordered mesostructured alumina prepared according to Example 6 | | | | Prior Art of Bagshaw U.S. Pat. No. 5,622,684 Worm-hole alumina prepared from Al-sec-(OBu)$_3$ and Pluronic 64L | | | |
|---|---|---|---|---|---|---|---|---|
| Cal. tem. (° C.) | $S_{BET}$ ($m^2/g$) | P.V. (ml/g) | $d_p^1$ (Å) | $d_{X-refl}^2$ (Å) | $S_{BET}$ ($m^2/g$) | P.V. (ml/g) | $d_P$ (Å) | $d_{X-refl}$ (Å) |
| 500 | 337 | 0.52 | 50 | 65 | 430 | 0.21 | 48 | 63 |
| 800 | 254 | 0.37 | 40 | 60 | 192 | 0.17 | 55 | None |
| TEM$^3$ | Clearly reticulated pores. No observable pore branching | | | | branched worm-hole channels | | | |

1. Pore diameter; 2. low angle X-ray reflection; 3. transmission electron micrograph

EXAMPLE 9

This example demonstrates the neutral surfactant contained in the as-synthesized mesostructured aluminum oxides in Examples 1–8 can be removed by solvent extraction. As a representative example, 1 g of assynthesized aluminum oxide made using TERGITOL 15-S-12 according to Example 3 was refluxed in 25 ml of ethanol for 3 h. The solid was recovered by filtration and heated at 150° C. The resulting dried white powder weighed only 0.47 g due to loss of the surfactant. The X-ray diffraction pattern of the solvent extracted aluminum oxides was similar to that shown in FIG. 1A.

2) 34.0 g of urea was added to the aluminum nitrate solution and the solution was heated at 85° C. under vigorous stirring until the pH increased to about 5.7; a white precipitate was formed at this point.

3) the precipitate was filtered and dispersed into 10 ml of water to make a slurry.

4) 2.76 g of (37 wt % aqueous HCl solution) was added to the slurry.

5) the mixture prepared in step (4) was aged at 65° C. overnight.

6) 6.75 g Tergitol 15-S-9 was added to the mixture obtained in step (5) and the resulting mixture was allowed to age at 45° C. overnight. Cooling the mixture to ambient temperature afforded a semi-transparent viscous sol.
7) 3.5 ml of 37 wt % NH$_4$OH aqueous solution was added to adjust the pH to 6 to 7, to obtain a white precipitate.
8) the precipitate was filtered and dried in air.
9) the product was dried at 100° C. for 6 h and then calcined at 500° C. for 4 h.

The molar composition of the reaction mixture was as follows:

1.0 mole aluminum salt 10.0 mole urea 0.5 mole HCl 0.2 mole Tergitol 15-S-9

0.58 mole NH$_4$OH 10.0 mole H$_2$O

Figure 8:
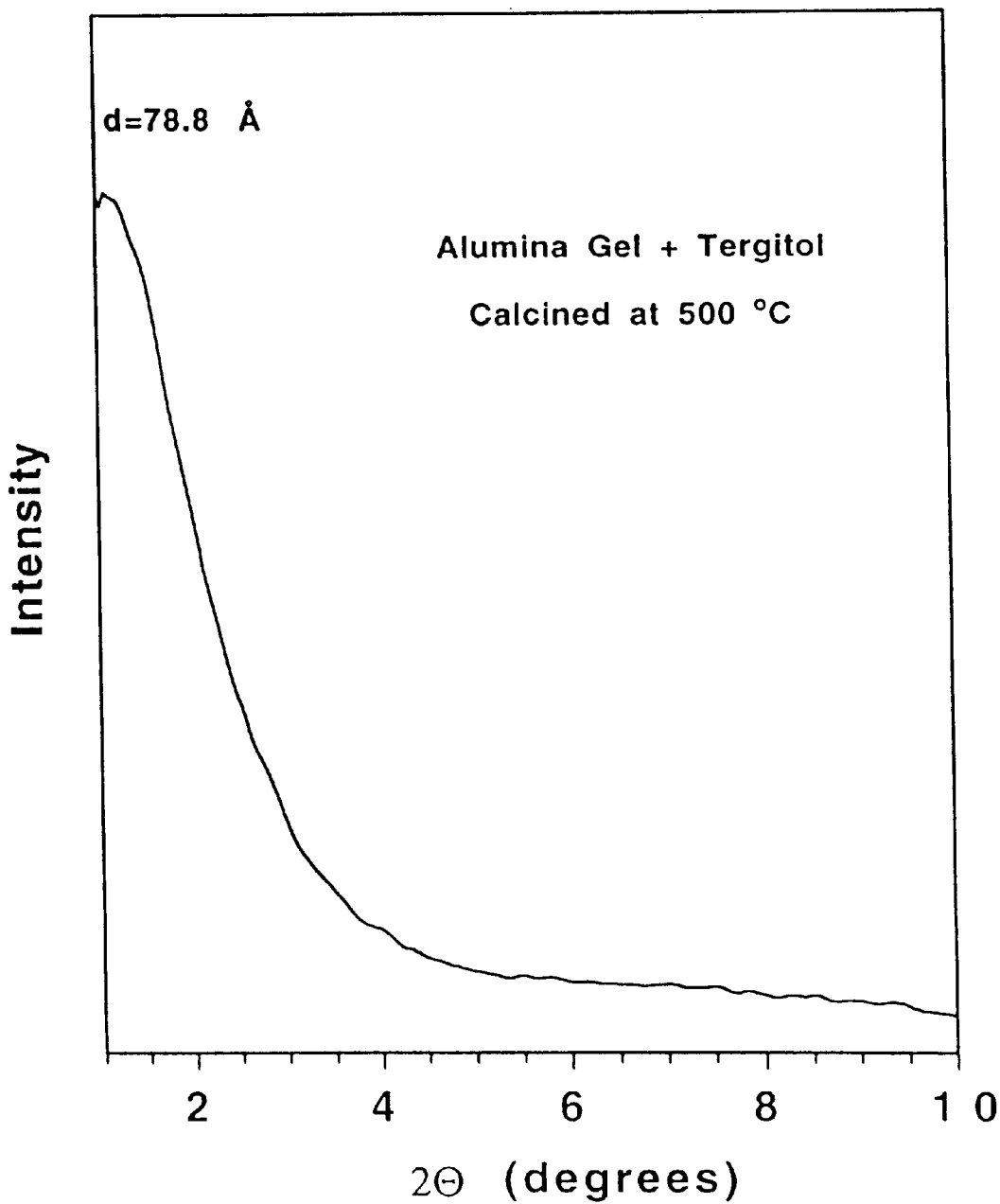
FIG. 8 is an x-ray powder diffraction pattern of the 500° C. calcined mesoporous alumina of Example 10.
Figure 9:
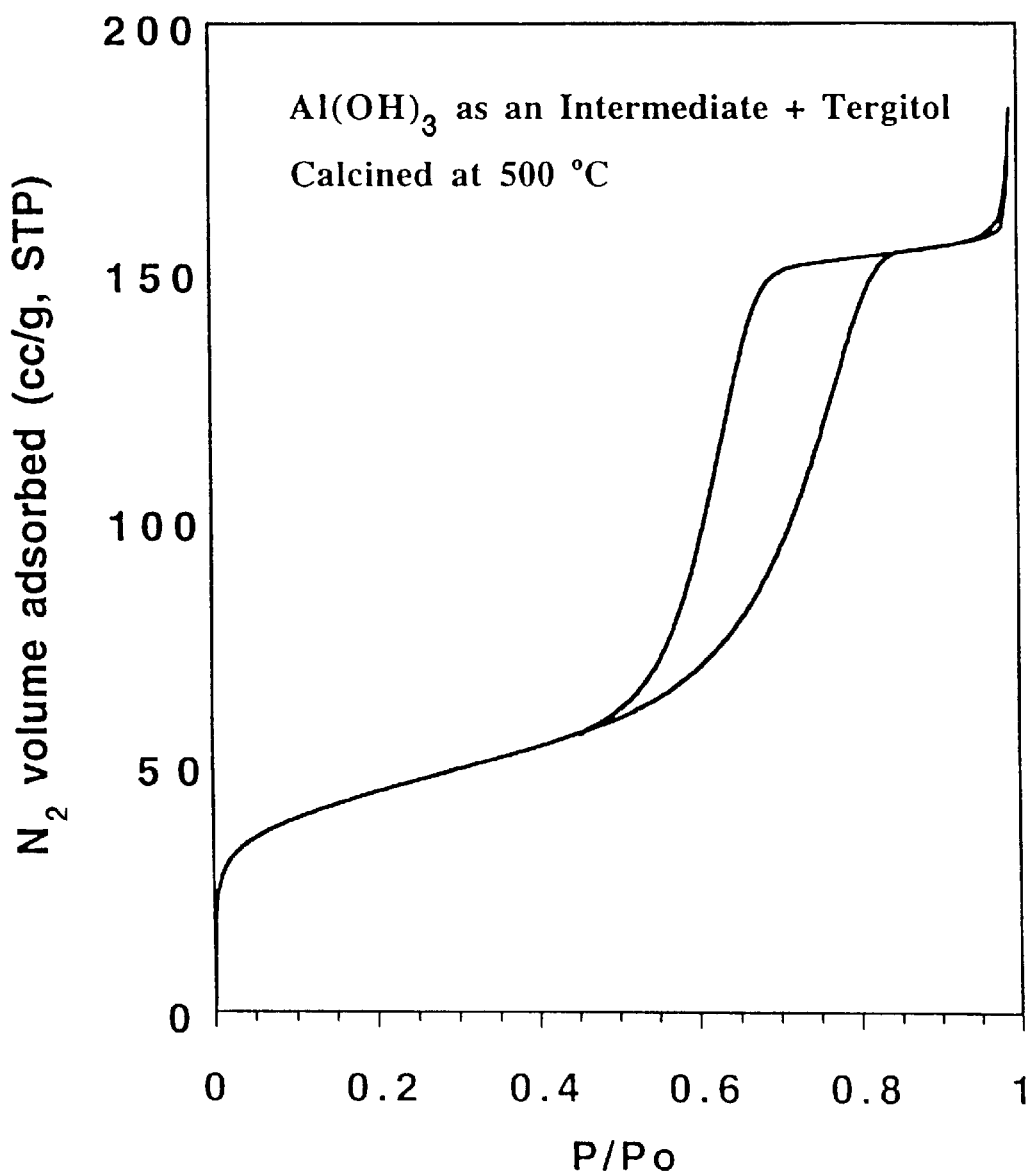
FIG. 9 is a graph of a $N_2$ adsorption-desorption isotherm for the 500° C. calcined mesoporous alumina of Example 11.

The calcined sample exhibited an X-ray diffraction as shown in FIG. 8. The N$_2$ isotherm, shown in FIG. 9, contained a clear step centered at P/Po near 0.65, corresponding to the filling of mesopores with BJH size of about 60 Å.

An equivalent mesostructured alumina was obtained by replacing urea in Step 2 of the procedure with an equivalent amount of ammonium hydroxide at ambient temperature and eliminating the heat treatment at 85° C.

EXAMPLE 12

This example demonstrates the art for the preparation of mesostructured aluminum oxide made using pseudo-boehmite as the aluminum source and a nonionic surfactant as the structure directing agent. The particular pseudo-boehmite was CATAPAL A produced by Condia Vista Cevalox Division, Tuscan, Ariz. The reaction was carried out in the following sequence of steps:
1) dispersing 3.26 g of CATAPAL A into 10 ml of water to make a slurry.
2) adding 2.76 g of HCl 37 wt % aqueous solution to the slurry.
3) aging the mixture prepared in step (2) at 65° C. overnight.
4) adding 6.75 g TERGITOL 15-S-9 to the mixture obtained in step (3) and aging the mixture at 45° C. overnight. Cooling the mixture to ambient temperature, caused a semi-transparent viscous gel to form.
5) adding in two increments 3.5 ml of 37 wt % NH$_4$OH aqueous solution to adjust the pH to 6 to 7, thus forming a white precipitate.
6) filtering the precipitate and drying it in air at ambient temperature.
7) drying the product at 100 ° C. for 6 h, then calcining the product at 500° C. for 4 h.

The initial molar composition:

0.5 mole Al$_2$O$_3$ H$_2$O (Pseudo-boehmite)

10. 0 mole H$_2$O 0.2 mole TERGITOL 15-S-9

0.50 mole NH$_4$OH

Figure 10:
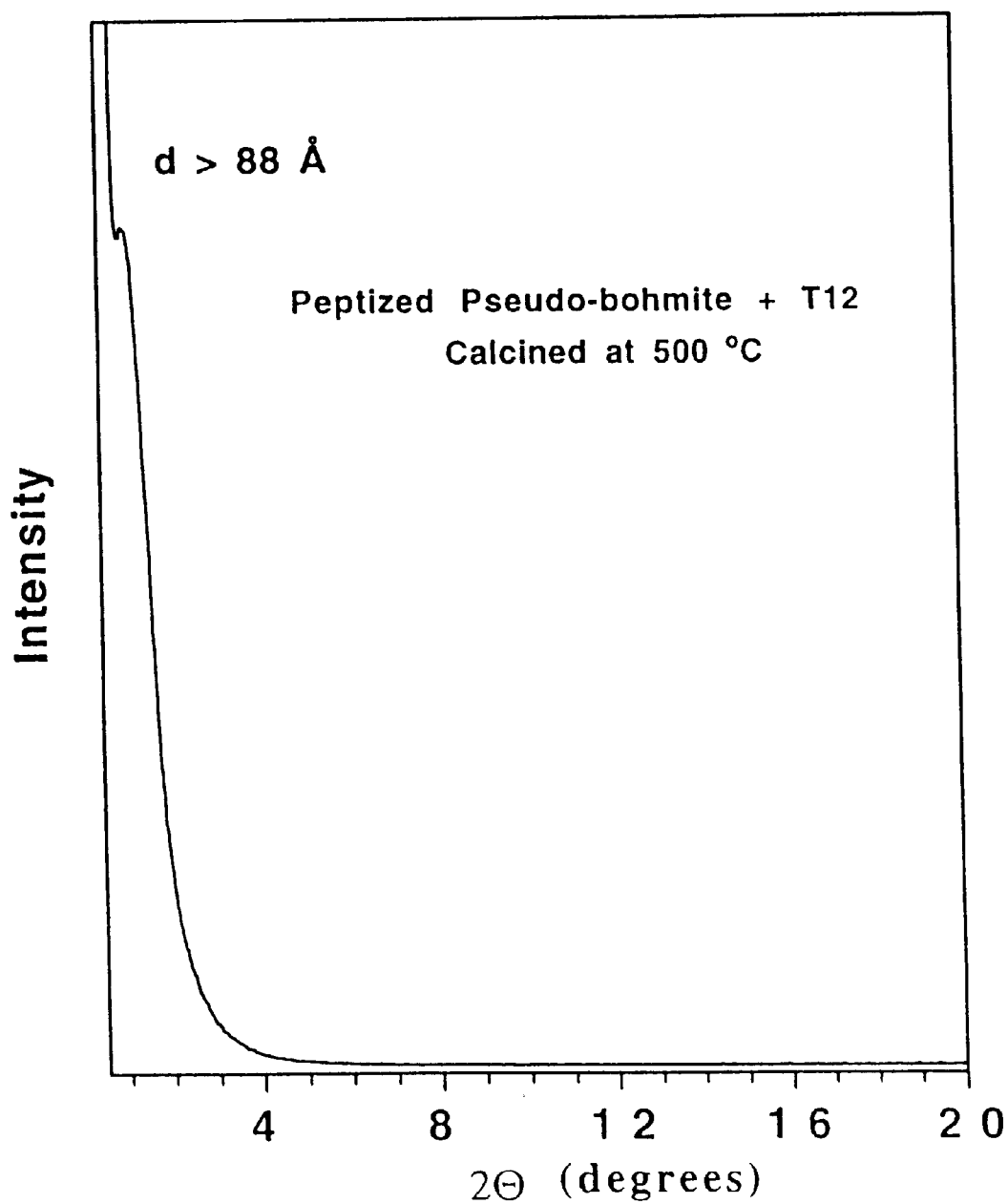
FIG. 10 is a $N_2$ adsorption-desorption isotherm for the 500° C. calcined mesoporous alumina of Example 12.
Figure 11A:
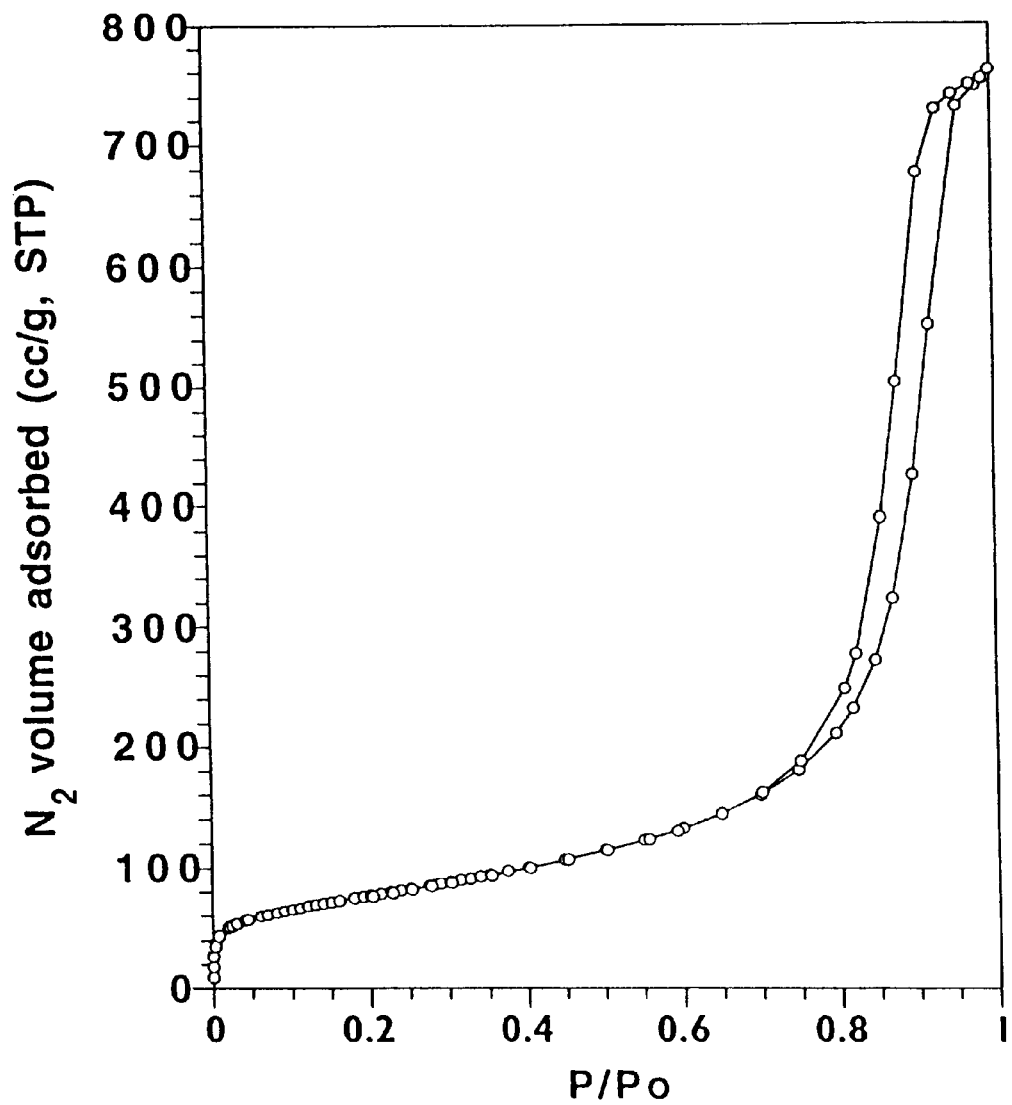
FIG. 11A is a K adsorption-desorption isotherm for the 500° C. calcined mesoporous alumina of Example 12.
Figure 11B:
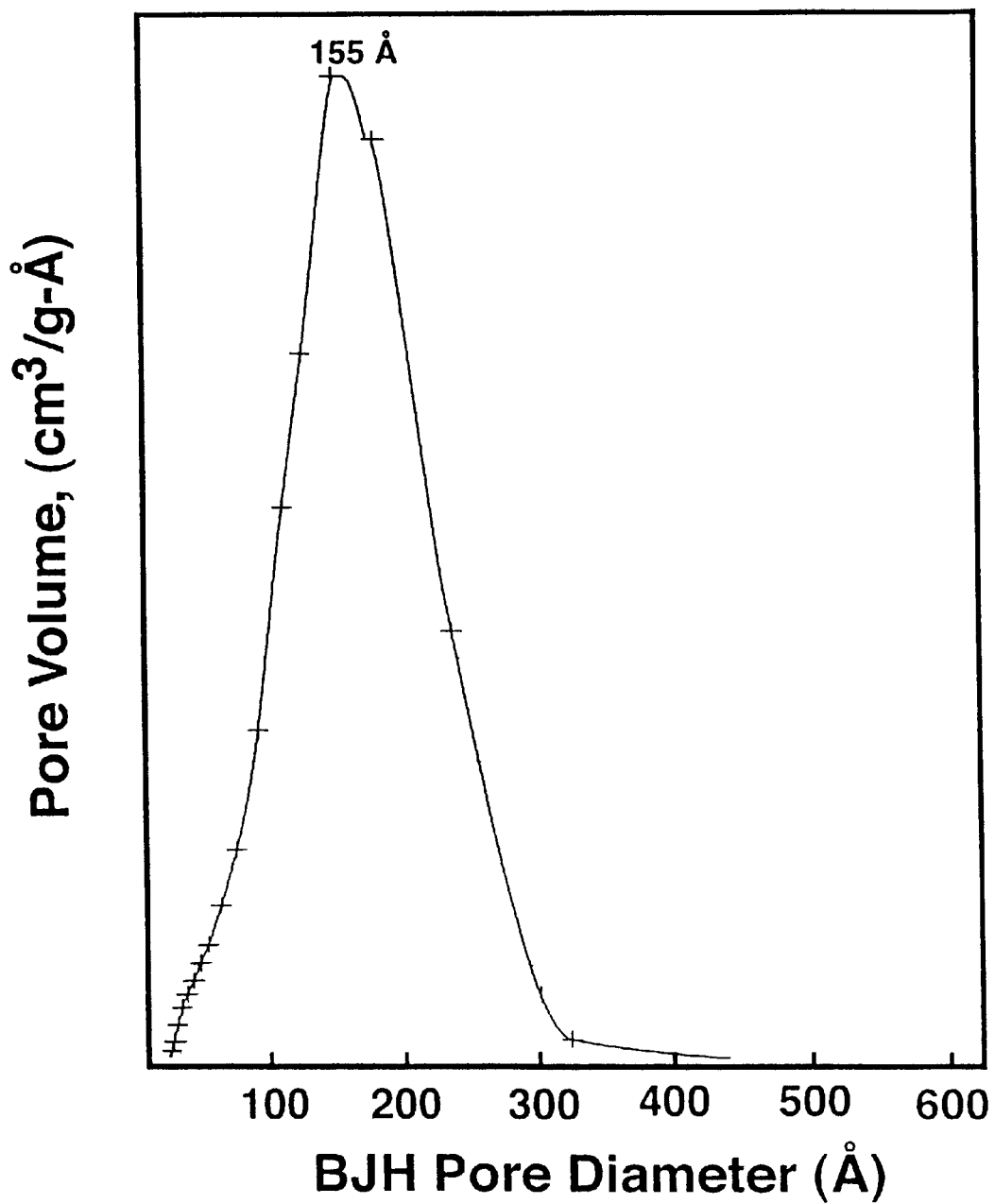
FIG. 11B is a graph showing the BJH pore size distribution for the mesoporous alumina of Example 12. The differential pore volume in plotted versus pore diameter.

The calcined sample exhibited a X-ray diffraction pattern as shown in FIG. 10. The N$_2$ isotherm shown in FIG. 11A clearly shows a step centered at P/Po around 0.90 which indicated the filling of very large mesopores with a BJH size of about 135 Å (FIG. 11B). The BET surface area was 273 m$^2$/g.

EXAMPLES 13–16

These examples illustrate the art for the preparation of mesostructured aluminum oxide doped with structure stabilizing metal ions selected from the group Ba$^{2+}$, Y$^{3+}$, La$^{3+}$, and Ce$^{3+}$. The desired metal ions were incorporated into the mesostructure by adding a water soluble salt of Ba$^{2+}$, Y$^{3+}$, La$^{3+}$, and Ce$^{3+}$ into the surfactant aqueous solution at the beginning of the synthesis. As described in Examples 1–5, Al$_{13}$ oligomers were used as the aluminum source but the desired metal salt was dissolved into the surfactant aqueous solution. The surfactant was TERGITOL 15-S-12 for each example. The molar composition of the reaction mixture was as follows:

$\frac{1}{13}$ mole Al$_{13}$O$_4$(OH)$_{24}$Cl$_7$ as a 50% (w/w) solution 0.13 mole TERGITOL 15-S-12

0.050 mole M(NO$_3$)$_y$ where M=Ba, y=2 (denoted example 13) M=Y, Y=3 (denoted example 14) M=La, y=3 (denoted example 15) and M=Ce, y=3 (denotes example 16).

2.5 moles of H$_2$O 0.58 moles of NH$_3$OH

Figure 12:
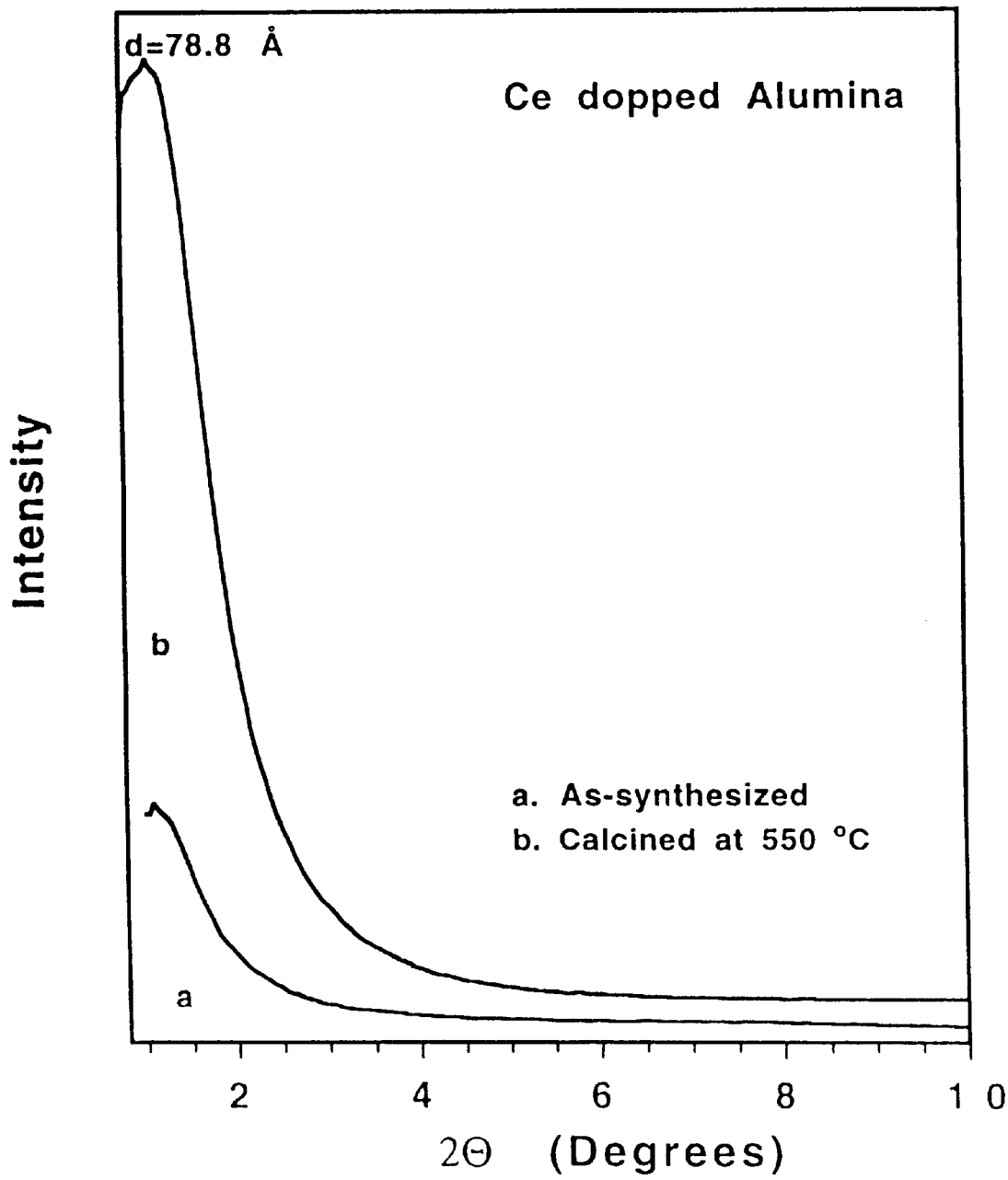
FIG. 12 shows an x-ray powder diffraction patterns for the cerium-doped as synthesized and calcined microporous alumina of Example 12.
Figure 13:
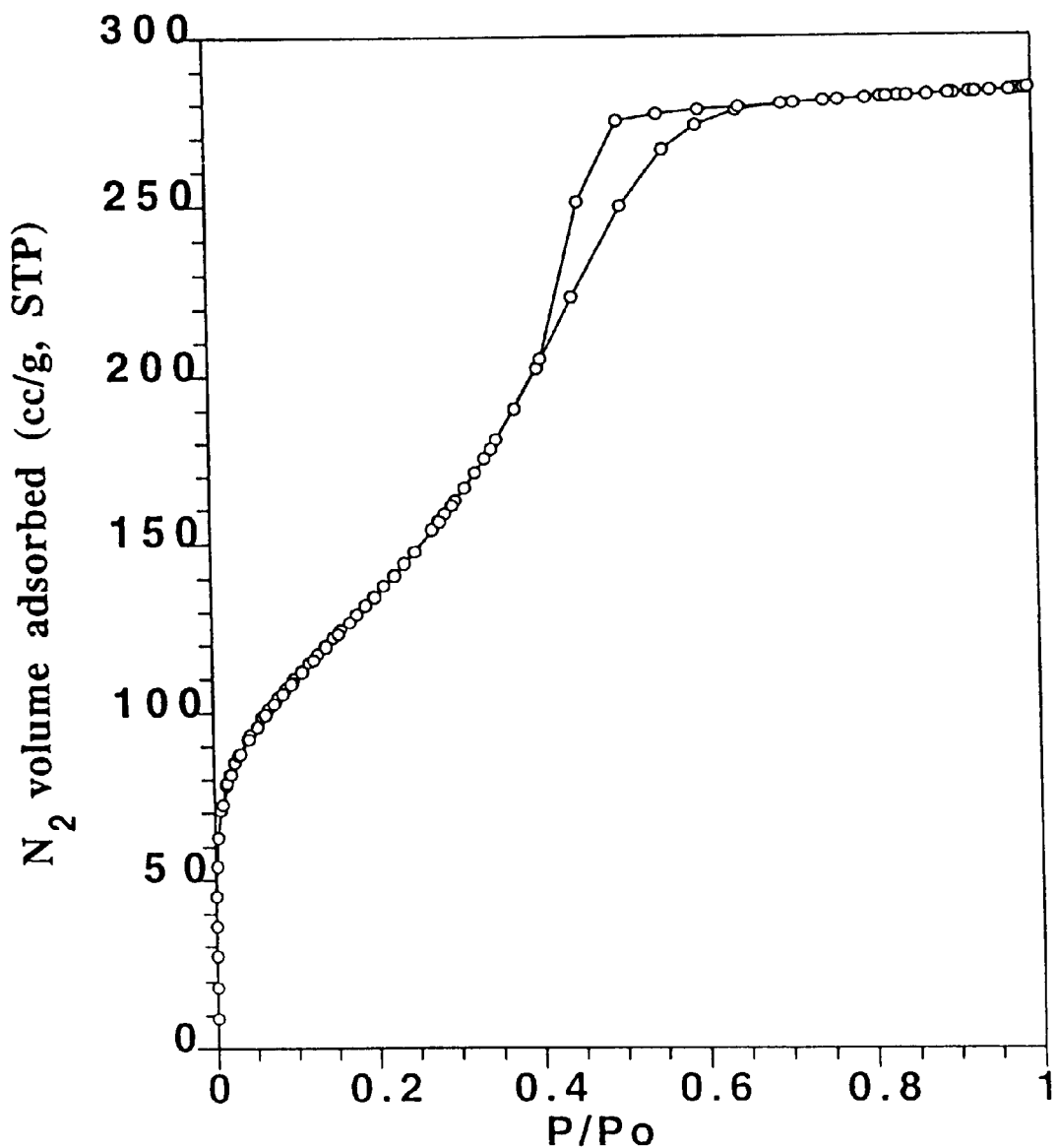
FIG. 13 is a $N_2$-adsorption-desorption isotherm for the mesoporous alumina of Example 13.

All four samples after calcination at 550° C. showed similar X-ray diffraction patterns with a d-value of near 80 Å (see FIG. 12). The Ba, Y and La doped samples exhibited a white color, but the Ce doped sample exhibited a bright yellow color. The N$_2$ isotherms were similar. One isotherm is shown in FIG. 13. The four samples denoted 13–16 had specific surface areas of 450, 423, 530, and 487 m$^2$/g respectively. These values were substantially higher than those for the non-doped alumina analogs described in Example 3.

EXAMPLES 17–19

These examples illustrate the art of post-synthesis treatment of as-synthesized mesostructured aluminum oxide with structure stabilizing phosphate ions to enhance thermal stability, as judged by the degree of surface area decrease upon calcination at 500° C. An assynthesized sample of alumina was prepared from Al, oligomers as the aluminum source and Tergitol 15-S-12 as the structure director according to Example 3. 5 g of the as-synthesized sample was heated at 100 ° C. for 6 h, and then impregnated with an aqueous solution of H$_3$PO$_4$. The specific surface areas for the calcined samples (500 ° C.) were in the range 375–425 m$^2$/g which is about 100 m$^2$/g higher than that of the non-treated analog calcined at 500° C. The compositions of the reaction mixtures were:

0.50 mole as-synthesized mesostructured alumina 4.0 mole H$_2$O

X mole H$_3$PO$_4$ where X=0.01, 0.06, and 0.08, corresponding to Examples 17, 18, 19 respectively.

The procedure for incipient wetness impregnation of calcined mesoporous aluminas was as follows:
1) The as-synthesized mesostructure was heated at 100° C. 6 h to remove H$_2$O.
2) To 5 g of material was added 3.5 ml of solution containing the stabilizing agent (H$_3$PO$_4$) to make a paste.
3) The paste was air dried over a 10 h period.
4) The surfactant was removed by calcination or by solvent extraction.

Figure 14:
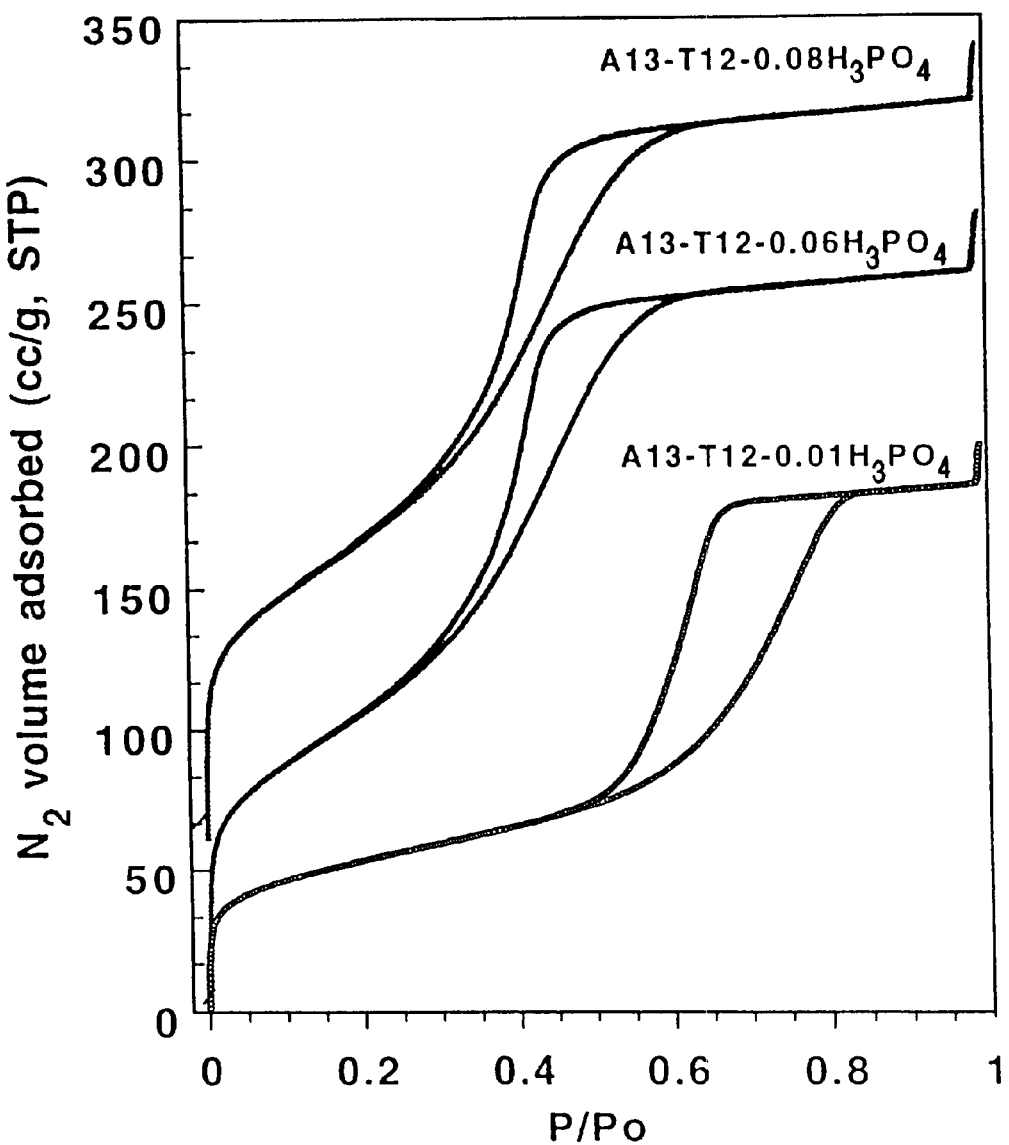
FIG. 14 is a graph showing the $N_2$ adsorption-desorption isotherms for the mesoporous aluminas of Examples 17 to 19.
Figure 15:
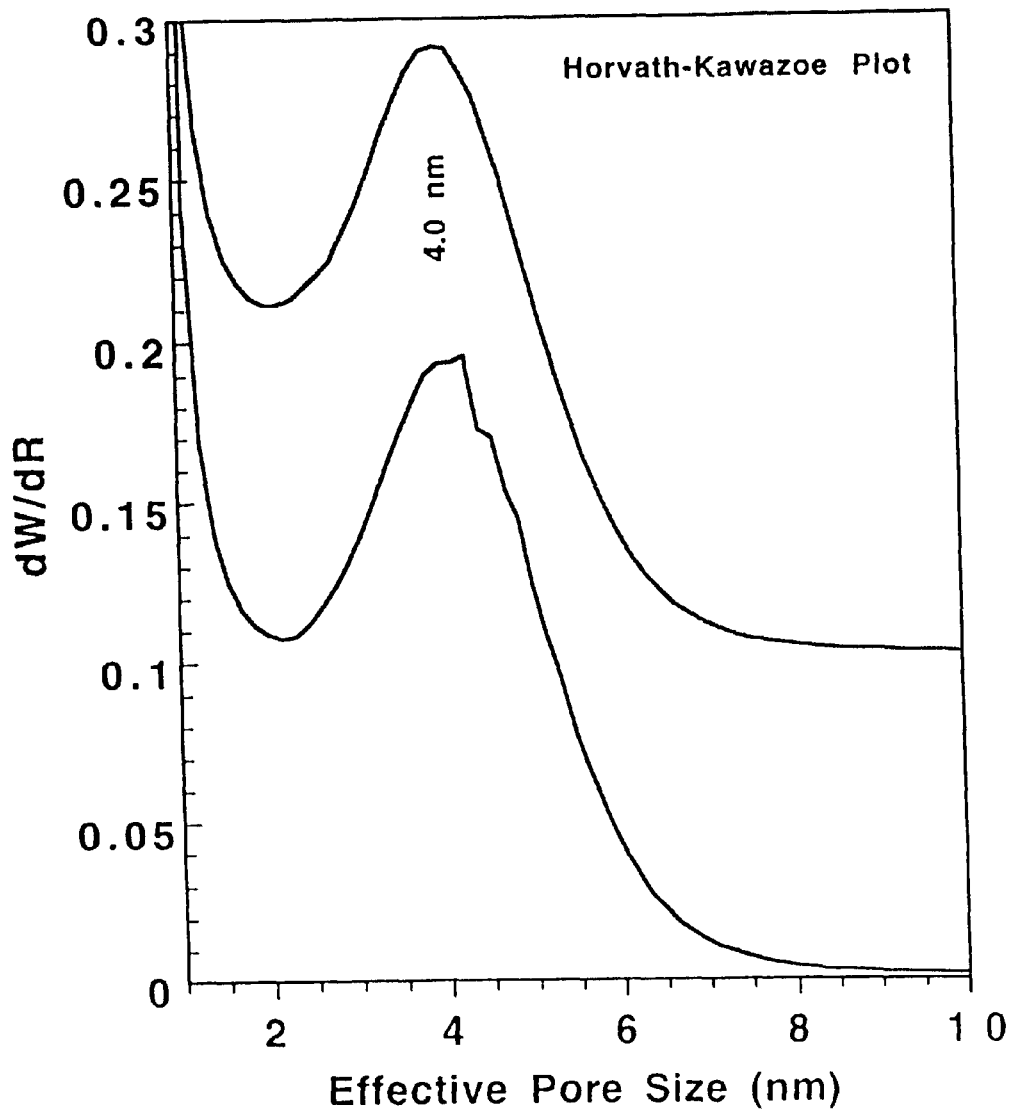
FIG. 15 is a graph showing a Horvath-Kawazoe framework confined-mesopore size distribution curve for the products of Examples 18 and 19.

The basal spacings for the single X-ray reflection exhibited by the products of Examples 16, 17, and 18 were 78, 62 and 62 Å, respectively. N$_2$ isotherms, shown in FIG. 14A, contain a step at P/Po in the region 0.45–0.60. Correspondingly, the average mesopore size were 55 and 40 Å (FIG. 14B), respectively. For the specific surface area, low concentration of dopant does not prohibit the surface area decrease upon calcination at 500° C. significantly, however, higher concentration of phosphorus does prohibit the surface area decrease significantly because the surface area for the sample prepared in Examples 17, 18 and 19 are 237, 393, 397 m²/g, respectively.

EXAMPLE 20

This example illustrates the art of preparation of mesostructured alumina in presence of various metal ions for incorporation into the alumina framework. A typical synthesis made use of Reheis 50% aluminum chlorohydrate as the aluminum source, TERGITOL 15-S-12 as the structure directing agent, a metal salt selected from a group comprising $Cr(NO_3)_3 9H_2O$, $Fe(NO_3)_3 9H_2O$, $CoCl_2 6H_2O$, $Ni(NO_3)_2 6H_2O$, $CUCl_2 2H_2O$, $Zn(NO_3)_2 6H_2O$, $VOSO_4 2H_2O$, and $RhCl_3 3H_2O$. The preparation procedures were basically the same as described in Example 13. The metal salt was dissolved in water, then mixed with aluminum chlorohydrate solution and surfactant. After the mixture was aged at 45° C. for 48 hours, aqueous ammonia was used to adjust the pH from 4.3 to 5.6 at ambient temperature. The initial molar composition of the reactants was:

0.05 moles of metal salt ⅟₁₃ moles of $Al_{13}O_4(OH)_{24}Cl_7$ as a 50 wt % solution 0.13 moles of TERGITOL 15-S-12

1.7 mole of $H_2O$ 0.55 moles of $NH_4OH$

These transition metal doped samples which after removal of the surfactant by calcination at 450°C. show dark green, rust-red, purple, yellow-green, sky-blue and white colors corresponding to Cr, Fe, Co, Ni, Cu and Zn, in their common oxidation states, respectively. All of the products showed X-ray diffraction patterns comprising a strong single peak with a basal spacing of about 70±3 ÅA. The TEM image of a $Co^{2+}$-doped product exhibited a disordered arrangement of reticulated pores with a diameter of about 5.0 nm. This is in accordance with the pore size result measured by $N_2$-adsorption. The surface area and pore volume for these metal doped aluminas are in the range of 350 to 410 m²/g and 0.40 to 0.73 cc/g. $Co^{2+}$, $Ni^{2+}$, $Mn^{2+}$, $Cu^{2+}$ incorporated samples showed higher surface area and pore volume than others.

FIGS. 16 through 23 illustrate the structures of the more commonly available polyethylene oxide surfactants that are suitable for the assembly of mesostructured alumina compositions from inorganic aluminum reagents according to the teachings of this invention.

It is intended that the foregoing description be only illustrative of the present invention and that the present invention be limited only by the hereinafter appended claims.

We claim:

1. A synthetic mesostructured hydroxylated aluminum oxide composition which optionally can contain metallic, non-metallic and metalloid elements substituting for a part of the aluminum while retaining the aluminum oxide composition as mesostructured, having at least one resolved X-ray diffraction peak corresponding to a basal spacing of at least 3.0 nm, framework confined pores at least 1.5 nm in diameter and a specific surface area of at least 150 m g prepared from an inorganic precursor of alumina and a pore forming nonionic surfactant in the absence of an aluminum alkoxide and the composition is thermally stable at 800° C. so that a calcined mesostructured aluminum oxide composition is maintained.

Figure 4:
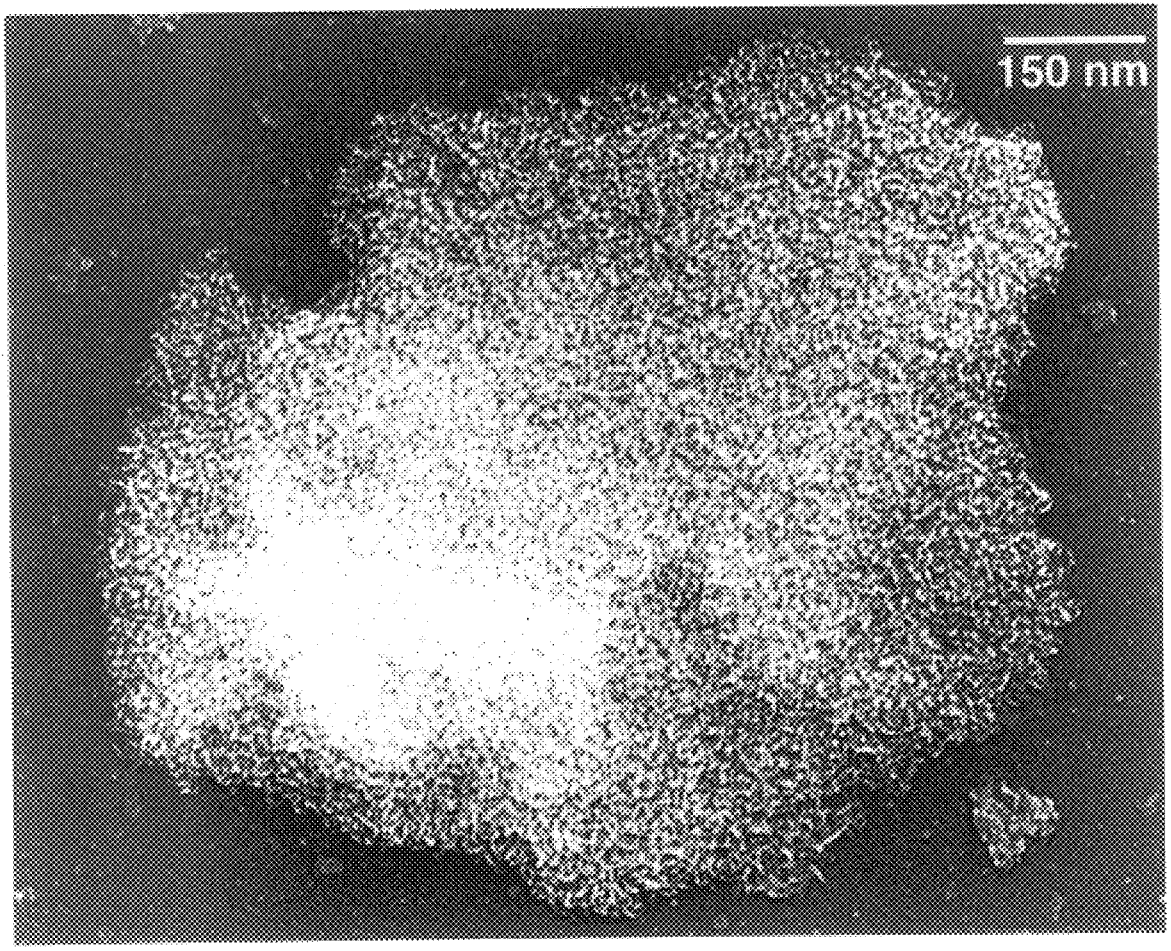
FIG. 4 is a TEM micrograph of the mesoporous alumina of Example 1.

2. The composition of claim 1 having a TEM image as shown in FIG. 4 and FIG. 7.

3. The composition of claim 1 having an X-ray diffraction pattern selected from the group consisting of FIGS. 1A, 1B, 5, 8, 10 and 12.

4. The composition of claim 1 having a $N_2$ adsorption-desorption isotherm and pore size distribution selected from the group consisting of FIGS. 3A, 3B, 6A, 6B, 9, 11A, 11B, 13, 14 and 15.

5. The composition of claim 1 wherein the aluminum oxide composition has been reacted with phosphoric acid in the presence of the surfactant.

6. The composition of claim 1 containing the surfactant.

7. A synthetic mesostructured hydroxylated aluminum oxide composition prepared from a reaction mixture comprising a nonionic surfactant and an inorganic aluminum reagent selected from the group consisting of a cationic aluminum salt, a cationic aluminum oligomer, a reactive alumina and mixtures thereof in the presence of a base or a base precursor in water to adjust pH and in the absence of an aluminum alkoxide and separating the aluminum oxide composition from the water to provide the composition which has framework mesopores, wherein the composition is thermally stable at 800° C. so that a calcined mesostructured aluminum oxide composition is maintained.

8. The composition of claim 7 wherein the surfactant has been removed from the composition.

9. The composition of claim 7 in which the surfactant has a terminal group which is selected from the group consisting of a hydroxyl group and an amino group.

10. The composition of any one of claims 7 or 8 having the formula:

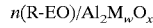

$n(R-EO)/Al_2M_wO_x$ wherein M is selected from the group consisting of P, Ba, Y, La, Ce, Sn, Ga, Si, Zn, Co, Ni, Mo, and Cu, which is free of water or is hydrated, wherein R-EO is a polyethylene oxide as the surfactant and wherein n is between about 0.04 and 2.0 and wherein w is between 0 and 0.30 and x is between 3.0 and 3.6.

11. The composition of claim 7 having an X-ray diffraction pattern with at least one reflection corresponding to at least a basal spacing of 3.0 nm.

12. The composition of any one of claims 1 or 7 which has been calcined and has a $N_2$, $O_2$ or Ar adsorption-desorption isotherm with a step at P/Po between 0.2 and 0.9 and at least one hysteresis loop.

13. The composition of any one of claims 1 or 7 which has been calcined and has a specific surface area between 150 and 1000 m²/g.

14. The composition of claim 7 wherein a molar ratio of the nonionic surfactant to aluminum in the inorganic aluminum reagent in the reaction mixture is between 0.02 and 1.0.

15. The composition of claim 7 containing the surfactant.

16. The composition of claim 7 in which the surfactant has been removed by calcination.

17. The composition of claim 7 in which the surfactant has been removed by solvent extraction.

18. The composition of claim 7 wherein the surfactant is selected from the group consisting of primary, secondary and tertiary fatty alcohol poly(ethoxylate).

19. The composition of claim 7 wherein the surfactant is a fatty acid poly(ethoxylate).

20. The composition of claim 7 wherein the surfactant is an alkyl phenol poly(ethoxylate).

21. The composition of claim 7 wherein the surfactant is a polyoxyethylene and polyoxypropylene block co-polymer.

22. The composition of claim 7 wherein the surfactant is selected from the group consisting of primary, secondary and tertiary fatty amine poly(ethoxylate).

23. The composition of claim 7 wherein the surfactant is a fatty acid polyoxyethylene and polyoxypropylene block co-polymer.

24. The composition of claim 7 wherein the surfactant is a fatty acid amide poly(ethyoxylate).

25. The composition of claim 7 wherein the surfactant is selected from the group comprising sorbitan ester and sorbitan poly(ethoxylate).

26. The composition of claim 7 wherein the cationic aluminum salt is selected from the group consisting of aluminum nitrate, aluminum chloride, aluminum perchlorate, aluminum sulfate and aluminum acetate.

27. The composition of claim 7 wherein the cationic aluminum oligomer is selected from the group consisting of aluminum chlorohydrate, aluminum nitrohydrate, and polymeric forms thereof.

28. The composition of claim 7 wherein the reactive alumina reagent is selected from the group consisting of amorphous alumina gel, amorphous alumina sol, amorphous aluminum hydroxide, amorphous flash calcined alumina trihydrate, pseudobohmite, and transition aluminas.

29. The composition of claim 7 containing at least one dopant incorporated by mixing water soluble salt of Ba, Y. La and Ce into the surfactant solution and wherein the molar ratio for the dopant to aluminum is between 0.005 and 0.15.

30. The composition of claim 7 containing at least one dopant selected from a group consisting of P, Ba, Y, La, Ce in an oxide form wherein the dopant is introduced into the composition by impregnation of the as-synthesized aluminum oxide with an aqueous solution of compound selected from a group consisting of an acid phosphate, nitrate, chloride and acetate of an element selected from the group consisting of Ba, Y, La and Ce and wherein the molar ratio for the dopant to aluminum is between 0.005 to 0.15.

31. The composition of any one of claims 29 or 30 having at least one resolved X-ray diffraction peak corresponding to a basal spacing of at least 3.0 nm, framework confined pores at least 1.5 nm in diameter, a specific surface area of at least 150 m$^2$/g.

32. The composition of any one of claims 29 or 30 which after calcination at higher temperature selected from 400 to 1000° C. which has an at least 5% higher specific surface area than that of a predecessor calcined at the same temperature without the dopant.

33. The composition of claim 7 wherein the composition has been reacted with phosphoric acid in the presence of the surfactant.

34. The composition of claim 7 wherein the base or base precursor is selected from a group consisting of aqueous ammonia, ammonium carbonate, and urea.

35. A process for the preparation of a synthetic mesostructured aluminum oxide composition which comprises:
(a) providing an amorphous aluminum hydroxide which has been precipitated from an aqueous solution;
(b) peptizing the alumina hydroxide of step (a) by addition of an acid;
(c) aging the solution of step (b) at a first temperature between about 0° C. and 100° C.;
(d) mixing the solution of step (c) with a nonionic surfactant;
(e) aging the solution of step (d) at a second temperature between about 0° C. and 100° C.;
(f) adjusting the pH of the product of step (e) to between about pH 6 to 8 using a base;
(g) separating the product from step (f); and
(h) removing the surfactant from the solid product to produce the mesostructured aluminum oxide composition, wherein the aluminum oxide can be hydroxylated.

36. The process of claim wherein the temperature in step (c) is between 35 and 85° C. and the temperature in step (e) is between 35 and 85° C.

37. A method for the preparation of a synthetic mesostructured aluminum oxide composition which comprises:
(a) preparing an aqueous solution of a cationic aluminum salt;
(b) preparing a freshly precipitated aluminum hydroxide from the salt by addition of aqueous solution of a base selected from the group consisting of urea and ammonia to the solution obtained in step (a), preferably until the pH is in the range 5–7;
(c) treating the precipitate obtained from step (b) with an acid selected from the group consisting of HCl and HNO$_3$ solution by selecting a H$^+$ to Al ratio between 0.3 to 1, and aging the mixture at a temperature between ambient temperature to 100° C.
(d) mixing a nonionic surfactant with the mixture obtained in step (c), and aging it at a temperature between ambient temperature between 0° C. and 100° C.;
(e) adjusting the pH of mixture (d) to about 5.5 to 8 by adding a base selected from the group consisting of aqueous ammonia, ammonium carbonate and urea and optionally aging the mixture at ambient temperature;
(f) separating the solid product from the mixture obtained from step (e) from the liquid;
(g) drying the solid product at a temperature between ambient temperature and 150° C.; and
(h) removing the surfactant contained in the solid product obtained from step (g) by a method selected from the group consisting of organic solvent extraction and calcination at a temperature between 2500 and 1000° C., wherein the aluminum oxide can be hydroxylated.

38. The method of claim 37 wherein the pH in step (b) is near 6.0, the temperature in step (c) is between 35 and 85° C. and the temperature in step (d) is between 35 and 85° C.

39. A method for the preparation of a synthetic mesostructured alumina composition which comprises:
(a) preparing an aqueous mixture of a starting agent selected from a group consisting of amorphous alumina sol, amorphous alumina gel, aluminum chlorohydrate, aluminum nitrohydrate or polymeric forms of aluminum chlorohydrate or aluminum nitrohydrate;
(b) mixing nonionic surfactant with the mixture obtained in step (a), and aging it at a temperature between about 0° C. and 100° C.;
(c) adjusting the pH of mixture (b) to about 5.5 to 8 by selecting a base selected from the group consisting of aqueous ammonia, ammonium carbonate and urea, and optionally aging the mixture at ambient temperature;
(d) separating the solid product from the mixture obtained from step (c) from the liquid;
(e) drying the solid product at a temperature between ambient temperature and 150° C.; and
(f) removing the surfactant contained in the solid product obtained from step (e) by a method selected from the group consisting of organic solvent extraction and calcination at a temperature between 250 and 1000° C., wherein the aluminum oxide can be hydroxylated.

40. A method for the preparation of a synthetic mesostructured alumina composition which comprises:
(a) preparing an aqueous solution of a cationic aluminum salt;

(b) preparing a freshly precipitated aluminum hydroxide from the salt by addition of aqueous solution of a base selected from the group consisting of urea and ammonia to the solution obtained in step (a), preferably until the pH is in the range 5–7;

(c) treating the precipitate obtained from step (b) with an acid selected from the group consisting of HCl and $HNO_3$ solution by selecting a $H^+$ to Al ratio between about 0.3 to 1, and aging the mixture at a temperature between ambient temperature to 100° C.;

(d) mixing a nonionic surfactant with the mixture obtained in step (c), and aging it at a temperature between 0° C. and 100° C.;

(e) adjusting the pH of mixture (d) to about 5.5 to 8 by adding a base selected from the group consisting of aqueous ammonia, ammonium carbonate and urea and optionally aging the mixture at ambient temperature;

(f) separating the solid product from the mixture obtained from step (e) from the liquid;

(g) drying the solid product at a temperature between ambient temperature and 150° C.; and (h) removing the surfactant contained in the solid product obtained from step (g) by a method selected from the group consisting of organic solvent extraction and calcination at a temperature between 250° C. and 1000° C., wherein the aluminum oxide can be hydroxylated.

41. The method of claim 40 wherein in step (b) the pH is near 6.0. the temperature in step (c) is between 35 and 85° C. and wherein the temperature in step (d) is 35 to 85° C.

* * * * *

UNITED STATES PATENT AND TRADEMARK OFFICE
CERTIFICATE OF CORRECTION

PATENT NO. : 6,027,706
DATED : February 22, 2000
INVENTOR(S) : Thomas J. Pinnavaia and Wenzhong Zhang It is certified that error appears in the above-identified patent and that said Letters Patent is hereby corrected as shown below:

Column 2,
Line 38, "Chem Hater." should be -- Chem Mater. --

Column 4,
Line 3, "$(C_{12}H_{25}PO_3^-)$" should be -- $(C_{12}H_{25}OPO_3^-)$ --.
Line 46, "s⁻I⁺ assembly" should be -- S⁻I⁺ assembly --.

Column 6,
Line 10, "K adsorption" should be -- $N_2$ adsorption --.
Line 53, "alumuna" should be -- alumina --.

Column 9,
Line 8, "a-alumina" should be -- α-alumina --.

Column 10,
Line 29, "m.p. 203°C" should be -- m.p. 2030°C --.
Line 43, "Uses: 7; Production" should be -- Uses: Production --.
Line 51, "a *preferred" should be -- a preferred --.

Column 12,
Line 25, "re preferred" should be -- are preferred --.

Column 13,
Line 19, "mol L-1" should be -- mol $L^{-1}$ --.
Line 40, "and v and" should be -- and w and --.

Column 18,
Line 35, "at -196 C" should be -- at -196°C --.
Line 38, "and 10-5 torr" should be -- and $10^{-5}$ torr --.
Line 55, "400-500 $m^{2/}g$" should be -- 400-500 $m^2/g$ --.
Line 59, "nesostrutured" should be -- mesostructured --.

Column 19,
Table 1 Title, "Nesostructured " should be -- Mesostructured --.

Column 13,
Line 11 of Table 1, "all capital A's" should be -- Å --.

UNITED STATES PATENT AND TRADEMARK OFFICE
CERTIFICATE OF CORRECTION

PATENT NO.    : 6,027,706
DATED         : February 22, 2000
INVENTOR(S)   : Thomas J. Pinnavaia and Wenzhong Zhang It is certified that error appears in the above-identified patent and that said Letters Patent is hereby corrected as shown below:

Column 22,
Line 37, "from Al" should be -- from $Al_{13}$ --.

Column 23,
Line 34, "70 ± 3ÅA." should be -- 70 ± 3Å. --.
Line 60, "150 mg" should be -- 150 $m^2g$ --.

Column 25,
Line 5, "poly(ethyoxylate)" should be -- poly(ethyloxylate) --.
Line 20, "pseudobohmite" should be -- pseudoboehmite --.

Claims,
Column 26,
Line 3, "process of claim wherein" should be -- process of Claim 35 wherein --.
Line 35, "2500 and 1000°" should be -- 250° and 1000° --.

Signed and Sealed this

Thirteenth day of November, 2001

*Attest:*

NICHOLAS P. GODICI
*Attesting Officer*   Acting Director of the United States Patent and Trademark Office